(12) United States Patent
Kim et al.

(10) Patent No.: US 12,210,473 B2
(45) Date of Patent: Jan. 28, 2025

(54) APPLICATION-TRANSPARENT NEAR-MEMORY PROCESSING ARCHITECTURE WITH MEMORY CHANNEL NETWORK

(71) Applicant: The Board of Trustees of the University of Illinois, Urbana, IL (US)

(72) Inventors: Nam Sung Kim, Champaign, IL (US); Mohammad Alian, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 47 days.

(21) Appl. No.: 17/980,685

(22) Filed: Nov. 4, 2022

(65) Prior Publication Data

US 2023/0071386 A1 Mar. 9, 2023

Related U.S. Application Data

(62) Division of application No. 17/250,785, filed as application No. PCT/US2019/050027 on Sep. 6, 2019, now Pat. No. 11,520,724.

(60) Provisional application No. 62/728,416, filed on Sep. 7, 2018.

(51) Int. Cl.
*G06F 13/40* (2006.01)
*G06F 12/10* (2016.01)
*G06F 13/16* (2006.01)

(52) U.S. Cl.
CPC .......... *G06F 13/4027* (2013.01); *G06F 12/10* (2013.01); *G06F 13/1673* (2013.01); *G06F 2212/1016* (2013.01)

(58) Field of Classification Search
CPC .. G06F 13/4027; G06F 12/10; G06F 13/1673; G06F 2212/1016; G06F 13/1647; G06F 12/0607; G06F 12/1072; Y02D 10/00
See application file for complete search history.

(56) References Cited

U.S. PATENT DOCUMENTS

| | | |
|---|---|---|
| 5,243,596 A | 9/1993 | Port et al. |
| 5,819,051 A | 10/1998 | Murray et al. |
| 5,903,718 A | 5/1999 | Marik et al. |

(Continued)

OTHER PUBLICATIONS

Larrivee, Steve, "SSD 101: Everythingi You Ever Wanted to Know", 2016, Cactus Technologies, Inc., p. 15 (Year: 2016).*

(Continued)

*Primary Examiner* — Faisal M Zaman
(74) *Attorney, Agent, or Firm* — Lowenstein Sandler LLP

(57) ABSTRACT

A computing device includes a host processor to execute a host driver to create a host-side interface, the host-side interface emulating a first Ethernet interface, assign the host-side interface a first medium access control (MAC) address and a first Internet Protocol (IP) address. Memory components are disposed on a substrate. A memory channel network (MCN) processor is disposed on the substrate and coupled between the memory components and the host processor. The MCN processor is to execute an MCN driver to create a MCN-side interface, the MCN-side interface emulating a second Ethernet interface. The MCN processor is to assign the MCN-side interface a second MAC address and a second IP address, which identify the MCN processor as a MCN network node to the host processor.

18 Claims, 11 Drawing Sheets

(56) References Cited

U.S. PATENT DOCUMENTS

| | | | | |
|---|---|---|---|---|
| 6,987,961 | B1* | 1/2006 | Pothana | G06F 15/167 |
| | | | | 455/412.1 |
| 7,620,526 | B2* | 11/2009 | Back | G01N 33/94 |
| | | | | 707/999.1 |
| 7,941,613 | B2* | 5/2011 | Pong | G06F 15/16 |
| | | | | 709/224 |
| 9,189,264 | B1* | 11/2015 | Steffen | G06F 9/542 |
| 10,191,865 | B1 | 1/2019 | Machulsky et al. | |
| 10,798,059 | B1* | 10/2020 | Singh | H04L 63/029 |
| 10,860,511 | B1* | 12/2020 | Thompson | G06F 13/28 |
| 11,520,724 | B2* | 12/2022 | Kim | G06F 13/1647 |
| 2003/0055929 | A1* | 3/2003 | Ding | H04L 41/00 |
| | | | | 709/201 |
| 2003/0095560 | A1* | 5/2003 | Arita | H04L 49/351 |
| | | | | 370/431 |
| 2003/0130832 | A1* | 7/2003 | Schulter | H04L 49/354 |
| | | | | 703/23 |
| 2004/0081005 | A1 | 4/2004 | Wayne, Jr. et al. | |
| 2007/0008989 | A1 | 1/2007 | Jogelkar | |
| 2007/0136594 | A1* | 6/2007 | Jordan | G05B 19/054 |
| | | | | 713/172 |
| 2010/0005219 | A1 | 1/2010 | Loughner et al. | |
| 2010/0262819 | A1* | 10/2010 | Yang | G06F 9/5055 |
| | | | | 712/30 |
| 2011/0047302 | A1 | 2/2011 | Hausman et al. | |
| 2011/0235573 | A1* | 9/2011 | Crain, Jr. | H04W 40/32 |
| | | | | 370/328 |
| 2012/0151048 | A1* | 6/2012 | Kitazawa | H04L 41/0846 |
| | | | | 709/224 |
| 2012/0324177 | A1* | 12/2012 | Shin | H04L 69/12 |
| | | | | 711/E12.001 |
| 2013/0100963 | A1 | 4/2013 | Hartman | |
| 2015/0378932 | A1* | 12/2015 | Souri | G06F 21/79 |
| | | | | 711/209 |
| 2016/0055021 | A1 | 2/2016 | Beveridge et al. | |
| 2016/0162404 | A1 | 6/2016 | Lee et al. | |
| 2016/0314094 | A1* | 10/2016 | Schade | G06F 15/161 |
| 2016/0364347 | A1 | 12/2016 | Yeung et al. | |
| 2018/0239725 | A1 | 8/2018 | Kumar et al. | |
| 2018/0365185 | A1* | 12/2018 | Risinger | G06F 13/105 |
| 2019/0155693 | A1* | 5/2019 | Bomma | G06F 11/1417 |
| 2019/0212797 | A1* | 7/2019 | Karidis | G06F 11/1441 |

OTHER PUBLICATIONS

"Coral Benchmark Codes," available at https://asc.llnl.gov/CORAL-benchmarks/, 8 pages.
Wang et al., "Bigdatabench: A big data benchmark suite from internet services," High Performance Computer Architecture (HPCA), 2014 IEEE 20th International Symposium on. IEEE, 2014, 12 pages.
Grossman, Leonid, "Large receive offload implementation in neterion 10gbe ethernet driver," Linux Symposium, 2005, 6 pages.
Melzer, et al., "IP checksum offload," Apr. 27, 1999, U.S. Pat. No. 5,898,713, 11 pages.
Jeong, et al., "mTCP: A Highly Scalable User-level TCP Stack for Multicore Systems," Proceedings of the 11th USENIX Conference on Networked Systems Design and Implementation, serial NSDI'14, Berkeley, CA, USA: Usenix Association, 2014, 15 pages.
Chan et al., "Improving server application performance via pure TCP ACK receive optimization," Presented as part of the 2013 USENIX Annual Technical Conference (USENIX ATC 13), San Jose, CA: USENIX, 2013, available at https://www.usenix.org/conference/atc13/technical-sessions/presentation/chan, 6 pages.
Singh et al., "Jupiter rising: A decade of close topologies and centralized control in Google's datacenter network," Sigcomm '15, 2015, 15 pages.
Andreyev, Alexey, "Introducing data center fabric, the next-generation Facebook data center network," 2014, available at https://code.facebook.com/posts/360346274145943/, 11 pages.
Deering et al., "FBRAM: a New Form of Memory Optimized for 3D Graphics," SIGGRAPH, Jul. 1994, 8 pages.
Draper, et al., "The Architecture of the DIVA Processing-in-memory Chip," ICS, Jun. 2002, 12 pages.
Elliot et al., "Computational RAM: A Memory-SIMD Hybrid and its Application to DSP," CICC, May 1992, 6 pages.
Mai et al., "Smart Memories: A Modular Reconfigurable Architecture," ISCA, Jun. 2000, 11 pages.
Oskin et al., "Active Pages: A Computation Model for Intelligent Memory," ISCA, Jun. 1998, 12 pages.
Patterson et al., "A Case for Intelligent RAM," Micro, IEEE, vol. 17, Mar. 1997, 11 pages.
Loh, Gabriel H., "3D-Stacked Memory Architectures for Multi-core Processors," ISCA, Jun. 2008, 14 pages.
Pawlowski, J. Thomas, "Hybrid Memory Cube," Hot Chips, Aug. 2011, 24 pages.
Zhu et al., "A 3D-stacked Logic-in-memory Accelerator for Application-Specific Data Intensive Computing," 3DIC, Oct. 2013, 7 pages.
Nai et al., "Graphpim: Enabling instruction-level pim offloading in graph computing frameworks," High Performance Computer Architecture (HPCA), 2017 IEEE International Symposium on. IEEE, 2017, 12 pages.
Pugsley et al., "NDC: Analyzing the impact of 3D-stacked memory+ logic devices on MapReduce workloads," Performance Analysis of Systems and Software (ISPASS), 2014 IEEE International Symposium on. IEEE, 2014, 11 pages.
Awan et al., "Identifying the potential of near data processing for apache spark," Proceedings of the International Symposium on Memory Systems. ACM, 2017, 8 pages.
Intel, "An Introduction to the Intel R QuickPath Interconnect," Document No. 320412-001US, Jan. 2009, https://www.intel.com/content/dam/doc/white-paper/quick-path-interconnect-introduction-paper.pdf, 22 pages.
Intel, "IvyTown Xeon + FPGA: The HARP Program," Workshop: CPU+FPGA—OpenCL Based High Level Synthesis for CPU+ FPGA Coherent Systems, International Symposium on Computer Architecture, ISCA, 2016, https://cpufpga.files.wordpress.com/2016/04/harp_isca_2016_final.pdf, 34 pages.
Asghari-Moghaddam, et al., "Chameleon: Versatile and Practical Near-DRAM Acceleration Architecture for Large Memory Systems," MICRO, 2016, 13 pages.
Asghari-Moghaddam, et al., "Near-DRAM acceleration with single-ISA heterogeneous processing in standard memory modules," IEEE Micro, vol. 36, 2016, 11 pages.
Gao et al., "Practical near-data processing for in-memory analytics frameworks," Parallel Architecture and Compilation (PACT), 2015 International Conference on. IEEE, 2015, 12 pages.
Lloyd et al., 8. S. Lloyd and M. Gokhale, "Near memory key/value lookup acceleration," Proceedings of the International Symposium on Memory Systems. ACM, 2017, 8 pages.
Kang et al., "FlexRAM: Toward an Advanced Intelligent Memory System," ICCD, Oct. 1999, 10 pages.
Patterson et al., "Intelligent RAM (IRAM): the industrial setting, applications, and architectures," ICCD, Oct. 1997, 2 pages.
Farmahini-Farahani et al., "NDA: Near-DRAM Acceleration Architecture Leveraging Commodity DRAM Devices and Standard Memory Modules," in HPCA, Feb. 2015, 13 pages.
Meany et al., "The IBM z13 memory subsystem for big data," IBM Journal of Research and Development, vol. 59, Jul. 2015, 11 pages.
Sukhwani et al., "Contutto: A Novel FPGA-based Prototyping Platform Enabling Innovation in the Memory Subsystem of a Server Class Processor," in Proceedings of the 50th Annual IEEE/ACM International Symposium on Microarchitecture, ser. MICRO-50 '17, 2017, 12 pages.
Chu et al., "Highlevel Programming Model Abstractions for Processing in Memory," Workshop on Near-Data Processing, Dec. 2013, 4 pages.
Kersey et al., "Lightweight simt core designs for intelligent 3d stacked dram," Proceedings of the International Symposium on Memory Systems. ACM, 2017, 11 pages.
Stuecheli et al., "CAPI: A Coherent Accelerator Processor Interface," IBM Journal of Research and Development, vol. 59, Jan. 2015, 7 pages.

(56) References Cited

OTHER PUBLICATIONS

Micron, "3D XPointTM Technology," https://www.micron.com/products/advanced-solutions/3d-xpoint-technology, Oct. 24, 2019, 1 page.

Ahn et al., "A scalable processing-in-memory accelerator for parallel graph processing" ACM/IEEE International Symposium on Computer Architecture (ISCA), Jun. 2015, 13 pages.

Zhang et al., "TOP-PIM: throughput-oriented programmable processing in memory," in Proceedings of the 23rd International symposium on High-performance parallel and distributed computing. ACM, 2014, 14 pages.

Ahn et al., "PIM-enabled instructions: A low-overhead, locality-aware processing-in-memory architecture," in Computer Architecture (ISCA), 2015 ACM/IEEE 42nd Annual International Symposium on. IEEE, 2015, 13 pages.

Gutierrez et al., "Integrated 3D-stacked server designs for increasing physical density of key-value stores," in 19th International Conference on Architectural Support for Programming Languages and Operating Systems, ASPLOS 2014, 14 pages.

Seshadri et al., "Ambit: In-memory accelerator for bulk bitwise operations using commodity dram technology," in Proceedings of the 50th Annual IEEE/ACM International Symposium on Microarchitecture. ACM, 2017, 15 pages.

Nair et al., "Active memory cube: A processing-in-memory architecture for exascale systems," IBM Journal of Research and Development, vol. 59, 2015,14 pages.

Shvachko et al., "The hadoop distributed file system," Mass storage systems and technologies (MSST), 2010 IEEE 26th symposium on. IEEE, 2010, 20 pages.

Zaharia et al., "Spark: Cluster computing with working sets," Proceedings of the 2nd USENIX Conference on Hot Topics in Cloud Computing, ser. HotCloud'10. Berkeley, CA, USA: USENIX Association, 2010, 7 pages.

Bridges et al., "Users Guide to MPICH, a Portable Implementation of MPI," Argonne National Laboratory, vol. 9700, 1995, 35 pages.

Qualcomm, "Snapdragon 835 Mobile Platform," 2016. [Online]. Available: https://www.qualcomm.com/products/snapdragon/processors/835, 9 pages.

Jacob et al., "Virtual memory in contemporary microprocessors," IEEE Micro, vol. 18, 1998, 17 pages.

Dumazet, Eric, "Busy polling: Past, present, future," NetDev 2.1, 2017, 4 pages.

Pugsley et al., "Comparing Implementations of Near-Data Computing with In-Memory MapReduce Workloads," Micro, IEEE, vol. 34, Jul. 2014, 9 pages.

The Tech Report, "The Exynos 5433 SoC,," Jan. 31, 2015, http://techreport.com/review/27539/samsung-galaxy-note-4-with-the-exynos-5433-processor/2, 59 pages.

Wei, Andy, "Qualcomm snapdragon 835 first to 10 nm," http://www.techinsights.com/about-techinsights/overview/blog/qualcomm-snapdragon-835-first-to-10-nm/, 2017, 2 pages.

Nvidia, "Nvidia R TegraR X1," https://international.download.nvidia.com/pdf/tegra/Tegra-X1-whitepaper-v1.0.pdf, 2015, 41 pages.

Micron, "Nvdimm," 2016, available at https://www.micron.com/products/dram-modules/nvdimm/, 2 pages.

Turner et al., "Diversifying the Internet," in Global Telecommunications Conference, 2005, GLOBECOM'05. IEEE, vol. 2. IEEE, 2005, 6 pages.

Anderson, et al., "Overcoming the Internet impasse through Virtualization," Computer, vol. 38, 2005, 7 pages.

"IPv4 standard," https://en.wikipedia.org/wiki/IPv4, accessed: Mar. 25, 2018, 9 pages.

"Ethernet frame" available at https://en.wikipedia.org/wiki/Ethernet frame, accessed: Mar. 25, 2018, 8 pages.

Connery et al., "Offload of top segmentation to a smart adapter," Aug. 10, 1999, U.S. Pat. No. 5,937,169, 19 pages.

"TCP frame," available at https://en.wikipedia.org/wiki/Transmission Control Protocol, accessed: Mar. 25, 2018, 14 pages.

Intel, "Nios II Processor," available at https://www.altera.com/products/processors/overview.html, 2017, 11 pages.

Intel, "Avalon R Interface Specifications," available at https://www.altera.com/content/dam/altera-www/global/en_US/pdfs/literature/manual/mnl_avalon_spec.pdf, 2017, 70 pages.

Alian et al., "Dist-gem5: Distributed Simulation of Computer Clusters," in ISPASS, 2017, 29 pages.

Li et al., "McPAT: An Integrated Power, Area, and Timing Modeling Framework for Multicore and Manycore Architectures" in MICRO, 2009, 12 pages.

"IPERF: The ultimate speed test tool for TCP, UDP and SCTP," available at https://iperf.fr/, 3 pages.

Bailey et al., "The NAS parallel benchmarks," The International Journal of Supercomputing Applications, vol. 5, 1991, 13 pages.

\* cited by examiner

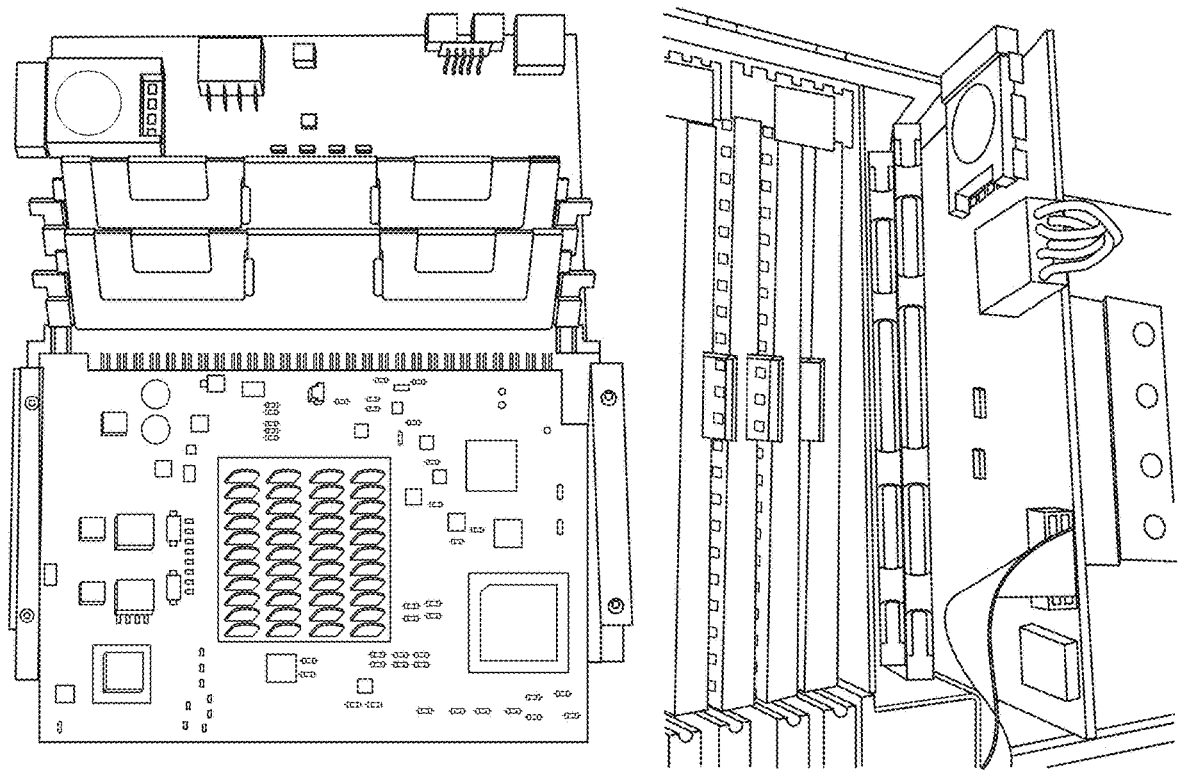
FIG. 9A  FIG. 9B
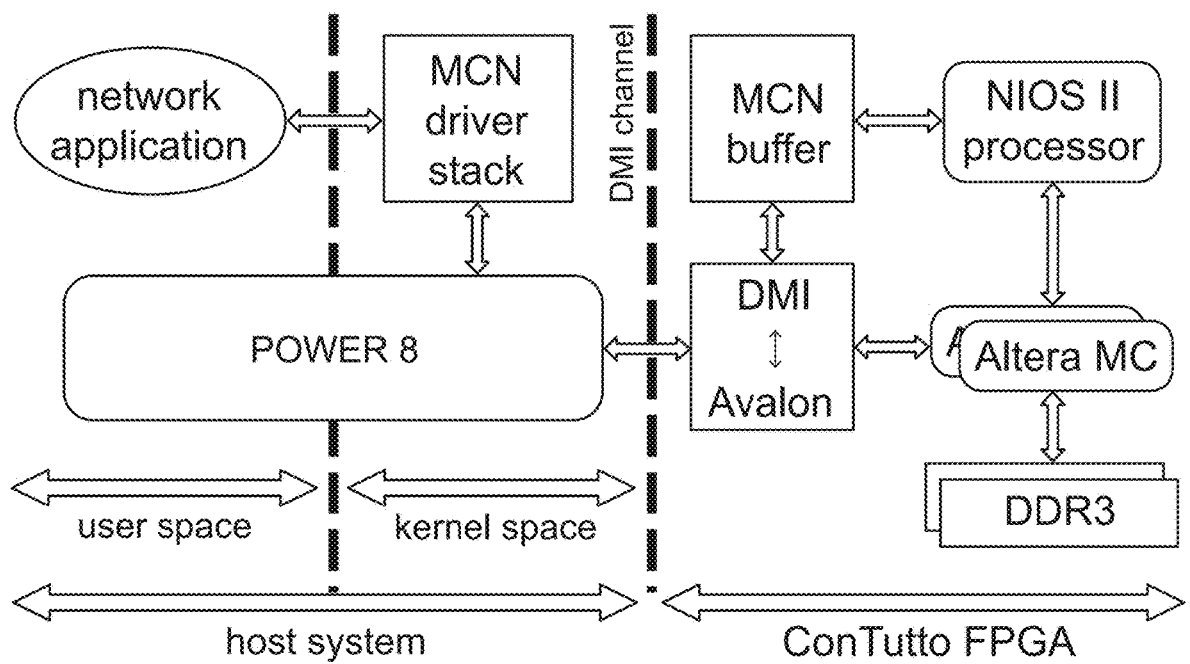
FIG. 9C

APPLICATION-TRANSPARENT NEAR-MEMORY PROCESSING ARCHITECTURE WITH MEMORY CHANNEL NETWORK

REFERENCE TO EARLIER FILED APPLICATION

This application is a divisional of U.S. patent application Ser. No. 17/250,785, filed Mar. 3, 2021, which is a National Stage of International Application No. PCT/US19/50027, filed Sep. 6, 2019, which claims the benefit under 35 U.S.C. § 119(e) of U.S. Provisional Patent Application No. 62/728,416, filed Sep. 7, 2018, all of which are incorporated herein, in their entirety, by this reference.

FEDERALLY SPONSORED RESEARCH OR DEVELOPMENT

This disclosure was made with government support under CNS1705047 awarded by the National Science Foundation. The government has certain rights in the invention.

BACKGROUND

The performance of servers running emerging data-intensive applications such as big-data analytic is limited by the dynamic random access memory (DRAM) capacity and double data rate (DDR) bandwidth. The expected deployment of emerging memory technologies such as 3D XPoint to servers will relieve the ever-increasing pressure on demanding larger memory capacity for such applications. However, for such servers to be cost-effective, servers need to increase the compute throughput and available memory bandwidth commensurate with the increase in memory capacity.

As part of such effort, researchers have proposed various near-memory processing architectures that tightly integrate a processor with memory to expose higher bandwidth to the processor. Such near-memory processing architectures, nonetheless, require significant changes in target applications especially to orchestrate the communication between the host and near-memory processors. This hurts application readiness and thus creates a big hurdle for wide adoption.

To address application readiness challenge for near-memory processing, many emerging data-intensive applications, which can benefit from near-memory processing, are often built upon distributed computing frameworks such as Hadoop, Spark, and Message Passing Interface (MPI). These distributed computing frameworks distribute given input data of an application and have many servers process the input data in parallel. As such, the high-level processing model of recent near-memory processing architectures was inspired and derived by the distributed computing framework.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 9A is an image of a ConTutto field programmable gate array (FPGA) board according to an embodiment.

FIG. 9B is an image of the board of FIG. 8A plugged into an International Business Machine (IBM S824L) system alongside regular Centaur DIMMs according to an embodiment.

FIG. 9C is a block diagram of an implementation example of the computing system of FIGS. 1A-1C according to an embodiment.

DETAILED DESCRIPTION

Figure 1A:
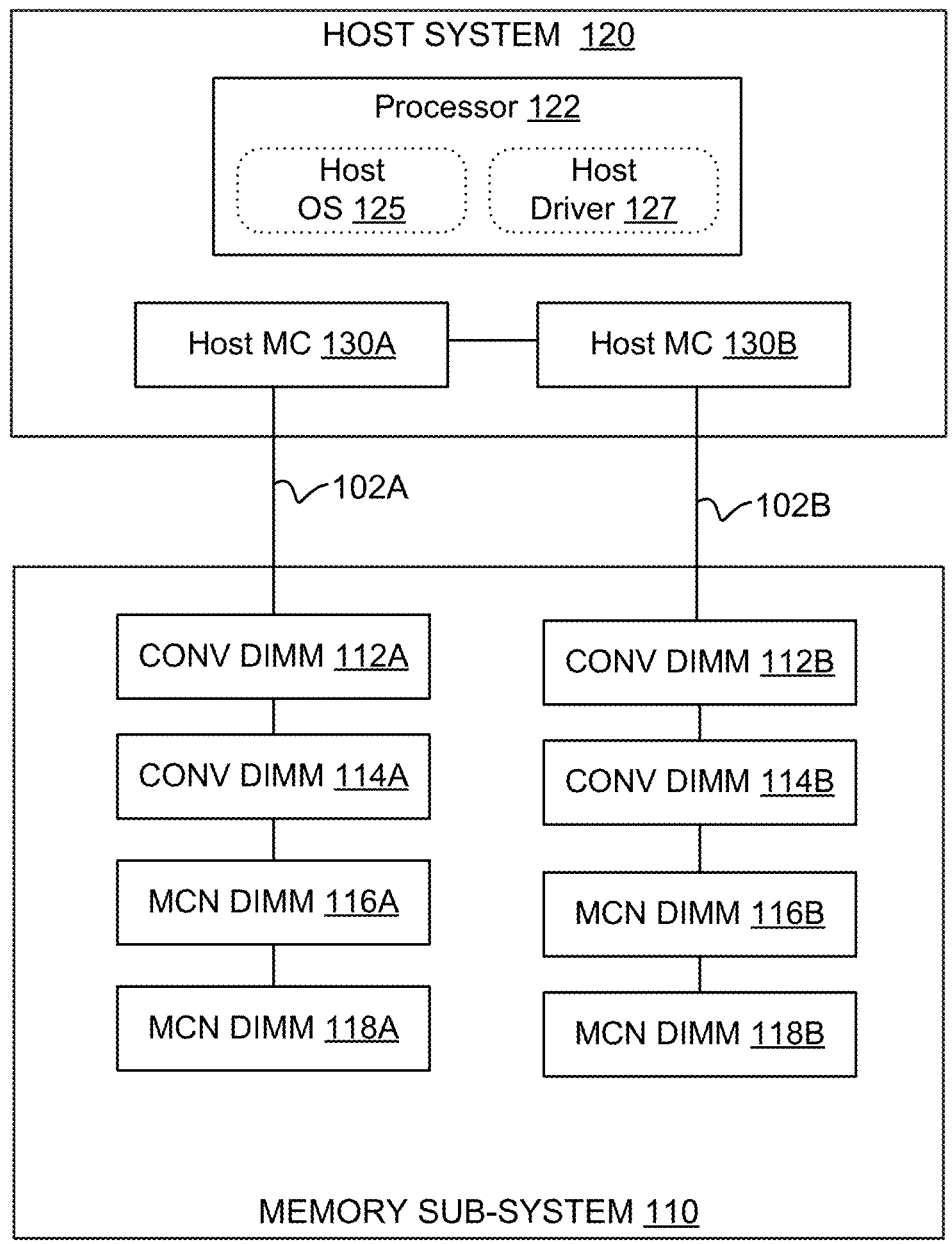
FIG. 1A is a block diagram of an exemplary computing system in which a memory sub-system includes memory channel network (MCN) memory modules according to one embodiment.

The present disclosure provides a Memory Channel Network (MCN), which builds on distributed computing frameworks (such as Hadoop, Spark, and MPI), and exploits high bandwidth and low latency of double data rate (DDR) or other similar interfaces. Specifically, MCN architecture aims to give the host and near-memory processors connected through a host interface (such as a DDR interface) in a server the illusion that these processors connect through Ethernet links. As such, MCN can provide a standard and application-transparent communication interface not only between the host and near-memory processors in a server, but also among such servers, seamlessly unifying near-memory processing with distributed computing for data-intensive applications.

The MCN is made up of a combination of hardware and software. For example, the hardware may include, but is not limited to, a memory module made MCN-capable with an MCN processor that will be explained in detail. The memory module may be a dual in-line memory module (DIMM) where memory components are coupled to the MCN processor on a substrate such as a printed circuit board (PCB) or the like. Other types of memory modules are envisioned. This "MCN DIMM" may be coupled between a host-side memory controller (MC) of a host computing system and installed DRAM devices, where the MCN processor may be viewed as a buffered device and the MCN DIMM as a buffered DIMM. As used herein, "coupled to" generally refers to a connection between components or devices, which can be an indirect communicative connection or direct communicative connection (e.g., without intervening components or devices), whether wired or wireless, including connections such as electrical, optical, magnetic, etc.

In various embodiments, an MCN interface may be implemented within the MCN processor to function similar to a network interface. In lieu of an Ethernet physical layer (PHY), MCN may build on any PHY for memory, including DDR PHY, GEN-Z™ PHY, or OpenCAPI™ PHY, to interface between a host-side MC and the MCN processor. In embodiments, the MCN processor runs a lightweight operating system (OS) with the network software layer used for running a distributed computing framework.

The MCN may also deploy software on both the host system and the MCN processor, to facilitate data exchange between the two within the memory channel network. In various embodiments, both the MCN and host processors may execute special MCN-adapted drivers. For example, the MCN processor may execute an MCN driver, and the host processor may execute a corresponding (similar) MCN driver, referred to herein as a host MCN driver (or just "host driver" for simplicity). The interplay between these two MCN drivers running on the MCN and host processors enable functionality akin to inter-node connections through Ethernet interfaces.

For example, the host driver running on the host processor may be similar to a conventional NIC driver but intercepts a network packet from the network software layer in the OS and redirects the network packet to a memory controller (MC) of an MCN DIMM if the network packet is destined (e.g., addressed) to the MCN DIMM. Unlike a conventional NIC generating an interrupt to inform a host of new network packets, the memory interface (and MC) do not have a corresponding mechanism. Hence, the host driver is adapted with a mechanism (or mechanisms) to determine whether any MCN DIMM is sending a network packet to the host or other MCN DIMMs, as will be discussed.

In various embodiment, these MCN DIMMs and associated MCN drivers together allow a server to run an application based on a distributed computing framework without any change in the host processor hardware, distributed computing middleware, and application software, while offering the benefits of high-bandwidth and low-latency communications between the host and the MCN processors over memory channels. Furthermore, each MCN processor accesses its DRAM devices on the same MCN DIMM through a local memory channel that is isolated from a global memory channel shared with other DIMMs and the host. Therefore, multiple MCN DIMMs can concurrently operate. That is, the aggregate memory bandwidth for processing is proportional to the number of MCN DIMMs, and thus grows as the number of MCN DIMMs is increased. As such, MCN architecture can serve as an application-transparent near memory processing platform, as well as unify near-memory processing in a server with the distributed computing across multiple servers.

Accordingly, MCN architecture can unify near-DRAM processing in a node with distributed computing across multiple such nodes. To further increase the utilized bandwidth and decrease the communication latency between MCN DIMMs, optional software and hardware optimization techniques may be implemented. Specifically, the MCN driver and some of the OS network layers may be optimized, leveraging unique properties of MCN over traditional Ethernet. Further communication efficiency may be achieved by adapting an already existing signal from the memory components to the host in order to interrupt the host MC when an MCN DIMM has outgoing packets, to reduce polling cycles. These optimizations will be discussed in detail.

The network architecture of the current datacenters follows a hierarchical model with the servers as the leaf nodes. A rack, as the basic building block of a datacenter, includes several servers connected together using a top of rack switch. As reported in several industry papers, the bandwidth of a top of rack switch ranges from 1 to 10 Gbps, while the top of rack switches are connected together through 40 to 100 Gbps connections. As discussed herein, even a basic MCN implementation provides higher bandwidth and lower latency than its 10 GbE counterpart. We propose to replace a rack with MCN-enabled servers that interconnect leaf nodes (e.g., MCN nodes) using a low cost, energy efficient interconnect to improve the energy efficiency of running I/O intensive applications while reducing the datacenter cost.

FIG. 1A is a block diagram of an exemplary computing system 100 in which a memory sub-system 110 includes memory channel network (MCN) memory modules according to one embodiment. The computing system 100 (or computing device) may further include a host system 120 including a host processor 122 and a memory controller (MC) for each bank of memory modules. For exemplary purposes, a (first) host MC 130A and a (second) host MC 130B are illustrated. The host processor 122 may execute a host operating system (OS) 125 and a host driver 127 (e.g., host MCN driver), as will be explained.

The memory sub-system 110 may include a number of memory modules, e.g., organized in banks that are coupled, via global memory channels 102A and 102B, to the host MC 130A and the host MC 130B, respectively. While only two global memory channels 102A and 102B are illustrated, it is to be understood that there could be multiple global memory channels more than what is illustrated.

To strike a balance between memory capacity and bandwidth, multiple DRAM devices that operate in tandem compose a rank, and one or more ranks are packaged on a memory module. A popular memory module called Dual In-line Memory Module (DIMM) has 64 data I/O (DQ) pins plus 8 DQ pins for a DIMM supporting error correcting code (ECC) capability. A first bank of DIMMS coupled to the host MC 130A may include a first conventional (CONV) DIMM 112A, a second CONV DIMM 114A, a first MCN DIMM 116A, and a second MCN DIMM 118A. A second bank of DIMMS coupled to the host MC 130B may include a first CONV DIMM 112B, a second CONV DIMM 114B, a first MCN DIMM 116B, and a second MCN DIMM 118B. In one embodiment, the convention (or CONV) DIMMs employ the DDR protocol, although other high-bandwidth, low-latency protocols are also envisioned. For example, the CONV DIMMs are DDR4 DIMMs, or other updated DIMM technology, in various embodiments. In various embodiments, the host MC 130A or 130B treats MCN DIMMs as buffered DIMMs and thus supports a mixture of multiple MCN and conventional DIMMs per memory channel.

A global memory channel couples an MC to one or more DIMMs. In a server class processor, an MC drives hundreds of DRAM devices and delivers Command/Address (C/A) signals through the global memory channel to the DRAM devices. Considering the gigahertz (GHz) operation frequency range of a modern DRAM device, this in turn leads to a serious signal integrity problem. For example, a C/A pin from a memory controller has to drive 144 DRAM devices (18×4 devices per rank supporting ECC multiplied by 8 ranks) when 8 ranks are populated per channel. In contrast, a data pin is connected to 8 DRAM devices, which is an order of magnitude fewer. Therefore, DIMMs for servers typically employ a buffer per DIMM, such as Registered DIMM (RDIMM) or Load-Reduce DIMM (LRDIMM), to reduce this huge capacitive load imposed to an MC and alleviate the signal integrity problem.

In one embodiment, a server (such as the computing system 100) may deploy another DIMM type with a buffer, e.g., a Centaur DIMM (CDIMM). Centaur is a memory buffer chip designed by IBM® for their POWER scale-up microprocessors. Each CDIMM with a tall form factor includes up to 80 commodity DDR DRAM devices and a Centaur device that provides a 16 MB eDRAM L4 cache, memory management logic, and an interface between DDR and IBM® proprietary memory interfaces. Note that the bandwidth available to the CPU remains constant as the global memory channel is shared by all the DIMMs although the memory capacity increases with more DIMMs per channel.

In embodiments, the host system 120 may execute the host OS 125 and perform memory management for kernel space drivers. For virtual to physical address mappings, the host OS 125 can manage hierarchical page tables, each with two or more levels, depending on a processor architecture. During the booting process, the Linux kernel is responsible for setting up page tables and turning on a Memory Management Unit (MMU). By default, the Linux kernel and users assume that any virtual page can be mapped to any physical page. However, host OS 125 may want to reserve a specific range of physical memory space exclusively for a (memory-mapped) I/O device and its I/O driver, and allow the I/O driver to access this physical memory range with virtual addresses since every address issued by the processor is a virtual address after the MMU is turned on.

In the Linux kernel within the host OS 125 may reserve the specific range of physical memory by editing the Device Tree Blob (DTB). A DTB is a set of attributes of the hardware components in a given system and is fetched during the booting process. Specifically, a node in a DTB represents a hardware component and describes information such as the number and type of CPUs, base physical addresses and sizes of memory devices, I/O devices, and the like. To reserve a specific region of physical memory, the host OS 125 may create a new node in the device tree, where a physical address range is explicitly enumerated and is tagged as reserved memory. At boot time, the kernel will exclude this physical address range from mapping to other processes, thereby creating a memory map hole. Later, the reserved memory region may be assigned to a device driver by setting the memory region (e.g., memory_region) parameter.

The host OS 125 may also execute software to instantiate an OS network layer. Transport Control Protocol/Internet Protocol (TCP/IP) is the most commonly used protocol for the distributed computing frameworks. An application sends and receives data through a TCP socket, e.g., using tcp_sendmsg( ) and tcp_recvmsg( ) system calls, respectively. When a user application calls tcp_sendmsg( ) the data is copied to a kernel buffer, fragmented into several segments of Maximum Transmission Unit (MTU) size, undergoes TCP/IP processing, and is eventually sent to a NIC for transmission. A maximum transmission unit (MTU) is the largest size packet or frame, specified in octets (eight-bit bytes), that can be sent in a packet- or frame-based network such as the Internet. The MTU limit exists since sending a packet with huge data at once is vulnerable to random transient errors in traditional physical links such as the Ethernet links, and increases the probability and the overhead of re-transmitting the packet. In Linux, the default value of MTU is 1,500 bytes. On the receiver side, the segments of a message are reassembled inside the Linux kernel and the complete message is copied to the user-space application.

Figure 2:
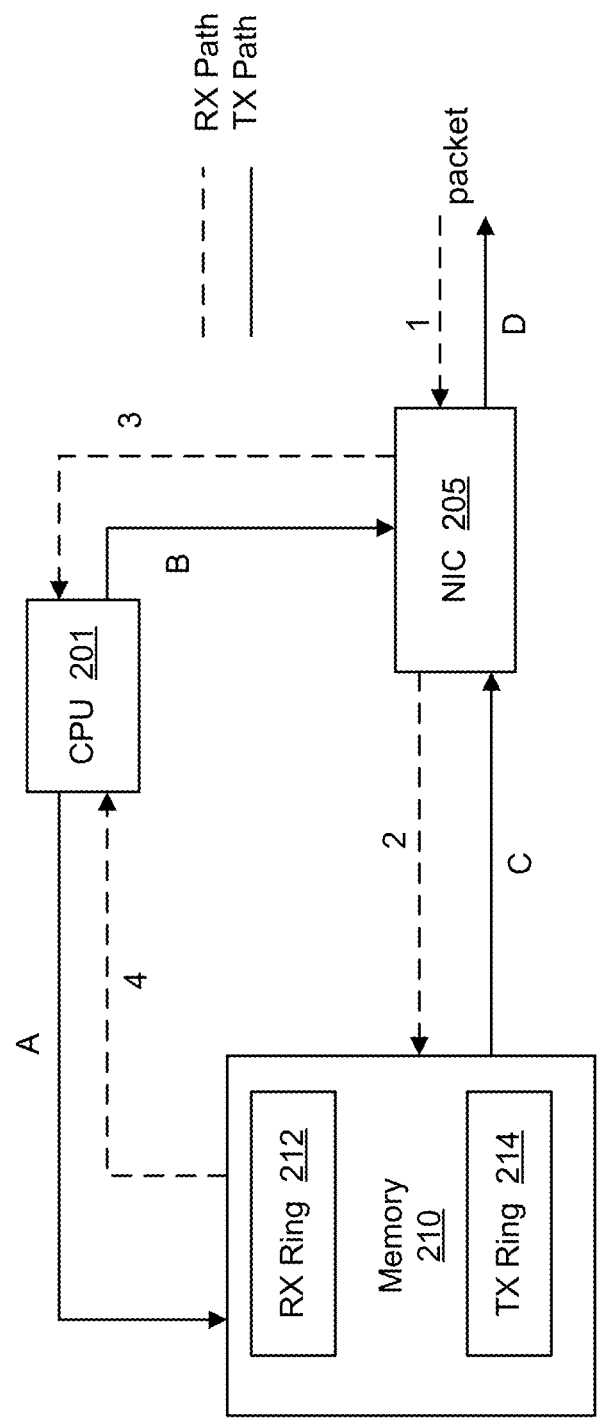
FIG. 2 is a block diagram that illustrates functionality of a conventional network interface card (NIC) according to various embodiments.

FIG. 2 is a block diagram that illustrates functionality of a network interface card (NIC) 205 according to various embodiments, where the NIC 205 may be a conventional NIC. More specifically, FIG. 2 illustrates the interactions between a processor 201, physical memory 210, and the NIC 205 when a network packet is received or transmitted. Once an outgoing network packet is processed in the TCP/IP stack, the network packet is written to a transmission (TX) ring buffer 214 (A) in the physical memory 210. Then, a NIC driver executed on the processor 201 informs the NIC 205 of the available packets in the TX ring buffer 214 (B). Later, the NIC 205 reads the ready-to-transmit descriptors from the TX ring buffer 214 and a direction memory access (DMA) transfers the data from the physical memory 210 to the NIC buffers of the NIC 205 (C). Finally, the NIC 205 sends the network packet out, e.g., onto an Ethernet link (D).

Similar to the TX ring, the NIC driver on the processor 201 manages a circular ring buffer (e.g., the RX ring buffer 212) in the memory for the incoming network packets, e.g., networked network packets. When a network packet is received (1 in FIG. 2), the NIC DMA transfers the network packet to the next available buffer in the RX ring buffer 212 (2). When the DMA-transfer is done, the NIC 205 sends a HW interrupt to the processor (3). Upon receiving the HW interrupt, the NIC driver schedules a software interrupt (e.g., a softIRQ). When a softIRQ handler of the processor 201 eventually executes, the softIRQ handler prepares a socket buffer by assembling the data inside the RX ring buffer 212 (4) and sends the network packet to a higher network layer for further processing. Note that once the NIC 205 starts to receive the network packet, switching to a polling-based approach may be preferred to a pure interrupt-based approach. This is because the performance cost of handling many hardware interrupts is notable, which can bottleneck the throughput of a high bandwidth network.

A NIC (such as the NIC 205) employs several techniques to achieve high bandwidth. For example, the NIC may utilize several offload engines. A TCP/IP offload engine (TOE) is a technology that is gaining popularity in high-speed Ethernet systems for the purpose of optimizing throughput, e.g., offloading communication processing from the host system 120. TOE components are incorporated into one of the printed circuit boards, such as the NIC or the host bus adapter (HBA). The NIC may further use a highly optimized driver and OS software stack such as Data Plane Development Kit (DPDK) or mTCP, with special purpose network processing libraries such as remote direct memory access (RDMA). The DPDK includes libraries to accelerate packet processing workloads running on a wide variety of CPU architectures. The mTCP is a set of TCP/IP applications for personal computers running PC-DOS, MS-DOS, FreeDOS, and other disk operating systems (DOS). The RDMA is direct memory access from the memory of one computer into that of another without involving either one's operating system. This permits high-throughput, low-latency networking, which is especially useful in massively parallel computer clusters. The NIC may further distribute the packet processing tasks over several CPU cores and use the aggregate memory bandwidth of the host processor 122 by interleaving DMA data across multiple memory channels.

Figure 1B:
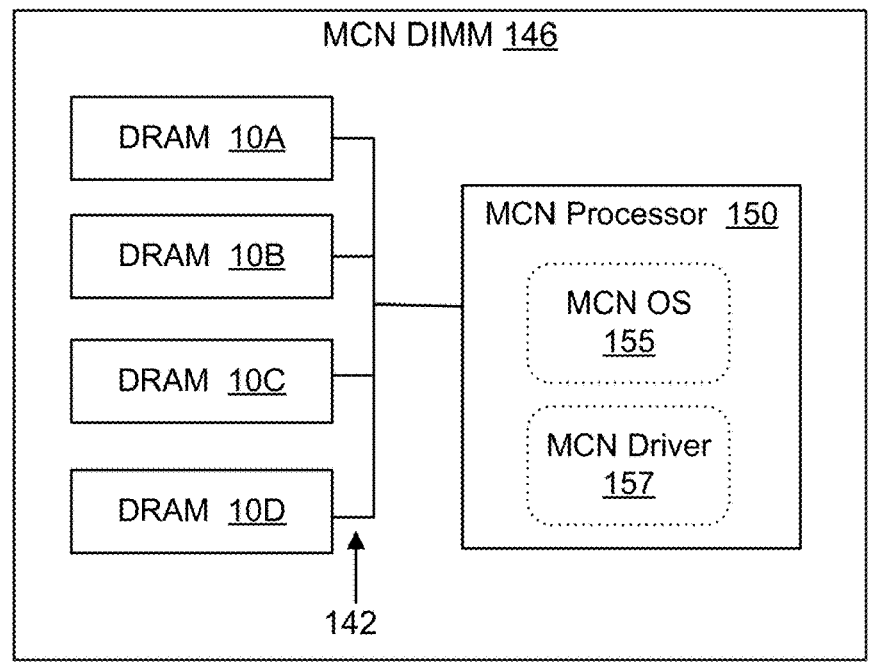
FIG. 1B is a block diagram of one of the MCN memory modules of FIG. 1A according to an embodiment.

FIG. 1B is a block diagram of an MCN DIMM 146 illustrated as an example of one of the MCN memory modules of FIG. 1A according to an embodiment. As mentioned, although the DIMM form factor for memory module is illustrated by way of example, other memory module form factors are envisioned. The MCN DIMM 146 may represent any MCN DIMM in FIG. 1A. The MCN DIMM 146 may include multiple memory components 10A, 10B, 10C, and 10D (hereinafter 10A . . . 10D), although the MCN DIMM 146 may include fewer or more memory components, which are all coupled through a set of local memory channels 142 (e.g., local DRAM channels) to an MCN processor 150. In at least one embodiment, the memory components 10A . . . 10D are DRAM chips. The MCN DIMM 146 may therefore provide near-memory processing capability for the computing system 100. The MCN processor 150 may execute an MCN OS 155 and an MCN driver 157, and include other firmware and logic.

In embodiments, the MCN DIMMs, the host driver 127, and the MCN driver 157 are designed such that the host system 120 runs applications based on the existing distributed computing frameworks without any change in the hardware of the host processor 122, distributed computing middleware, or application software. That is, MCN does not require modification in the host processor 122 and commodity DRAM architectures, as MCN limits hardware changes to those of the MCN processor 150. Further, the MCN processor 150 of each MCN DIMM is to access the DRAM devices on the same MCN DIMM through the local memory channels 142, which is isolated from the global memory channel 102A or 102B. Each memory module (e.g., MCN DIMM) may, therefore, access its memory components 10A . . . 10D independently of other memory modules (e.g., other DIMMs) of the memory sub-system 110.

Therefore, multiple of the MCN DIMMs 116A, 118A, 116B, 118B may be concurrently accessed by the MCN processor 150 through its local MCN MC (170 in FIG. 1C), multiplying the aggregate memory bandwidth for processing, as illustrated in FIGS. 1A and 1B. This is in contrast to a traditional memory sub-system, where the memory bandwidth for processing remains constant regardless of the number of DIMMs per memory channel. This limitation is due to multiple DIMMs sharing the global memory channel and the host processor 122 can access only one DIMM at a time through the shared global memory channel 102A or 102B, for example. As such, MCN architecture can serve as an application-transparent near-memory processing platform, as well as unify the near-memory processing in a node (akin to a network node) with the distributed computing across multiple such nodes formed by other MCN memory modules (e.g., DIMMs). Accordingly, the MCN DIMM 146 may also be referred herein to as an MCN node (or just a node).

Figure 1C:
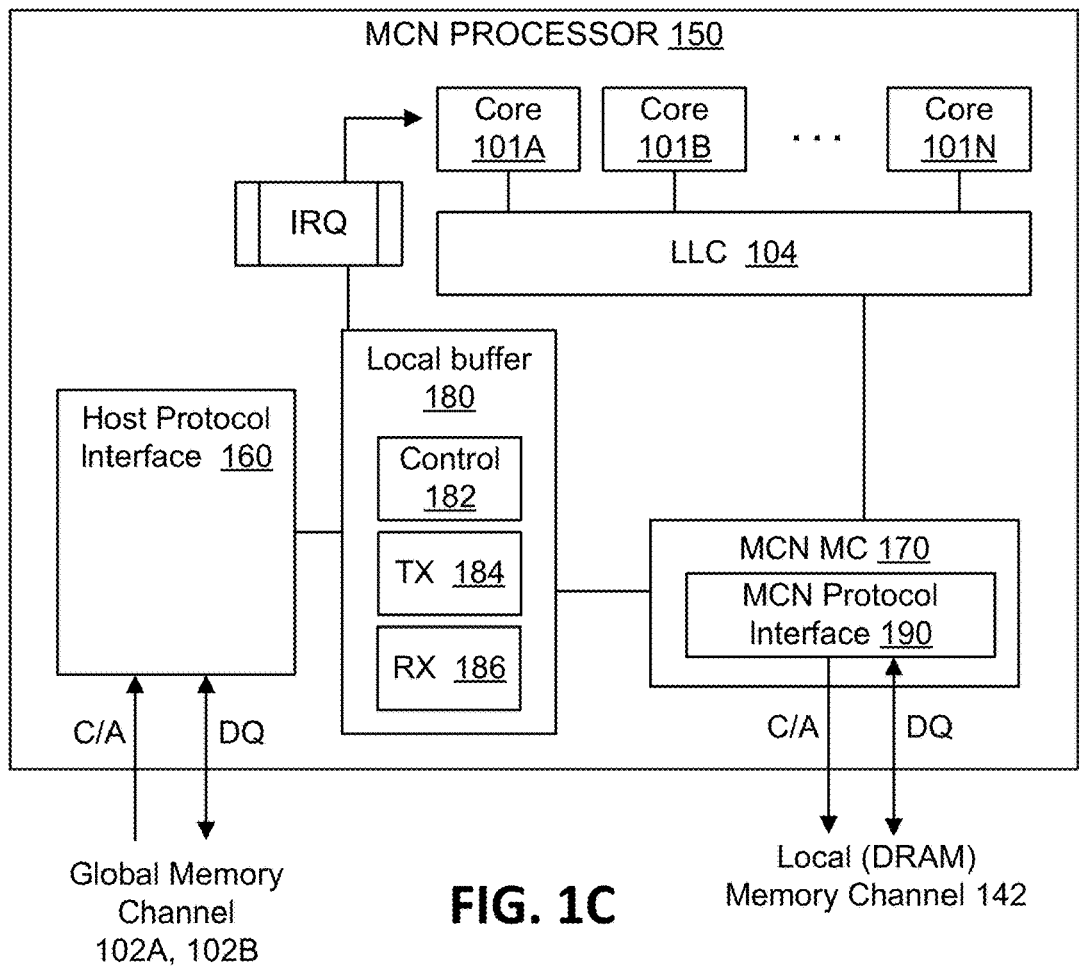
FIG. 1C is a block diagram of an MCN processor disposed on the MCN module of FIG. 1B according to an embodiment.

FIG. 1C is a block diagram of the MCN processor 150 disposed on the MCN DIMM 146 of FIG. 1B according to an embodiment. The MCN processor 150 may include, but not be limited to, one or more processor cores 101A, 101B, . . . 101N, a last level cache (LLC) 104, a host protocol interface 160, an MCN memory controller (MC) 170, and a local buffer 180. In various embodiments, the MCN MC 170 further includes an MCN protocol interface 190.

The local buffer 180 may be any type of local memory, such as static random access memory (SRAM), flash memory, or other fast-access memory, whether volatile or non-volatile. Further, the host protocol interface 160 may service DDR DIMM devices, and thus may be a host DDR interface. Further, the MCN protocol interface 190 may service DDR DRAM memory components and thus be an MCN DDR interface. Use of different protocols is envisioned for servicing memory components of other-than-DDR protocol, including NAND flash, 3D crosspoint (X point), and phase change memory (PCM), for example. The local buffer 180 may be formed with a dual-port SRAM device or other dual-port memory device in different embodiments.

The local buffer 180 may form a buffer between the global memory channel 102A or 102B to which the host protocol interface 160 is coupled and the MCN MC 170, which is coupled to the local (DRAM) memory channels 142. The local buffer 180 may further include control fields 182, a transmission buffer 184 (e.g., TX buffer 184), and a receiving buffer 186 (e.g., RX buffer 186), which are discussed in more detail with reference to FIG. 3A. In one embodiment, the TX buffer 184 and/or the RX buffer is a circular buffer, or some other type of memory buffer.

In some embodiments, the MCN processor 150 is a small, low-power, but capable mobile processor used in access points on a buffer device of each MCN DIMM. Further, if the power constraint of DIMMs prevents from taking more capable processors for MCN DIMMs, then one can bring an external power cable to DIMMs as do NVDIMMs.

With additional reference to FIG. 1C, the local buffer 180 may be approximately 96 KB in a typical quad-core mobile processor, but other sizes are envisioned. The host protocol interface 160 may include a physical layer (PHY) (such as a DDR PHY) and be adapted with a protocol engine that amplifies and repeats DRAM C/A and data input/output (DQ) signals from/to the host MC 130A or 130B. The host protocol interface 160 may also perform two operations that are specific to the MCN.

First, upon receiving a memory write request from a host MC, the host protocol interface 160 retrieves a command, a host physical address (HPA), and 64-byte data from the captured C/A and DQ signals from the host MC 130A or 130B. The host protocol interface 160 may further translate the HPA to a local address of the local buffer 180, and write the data to the local buffer 180.

Second, when servicing a memory-read request from a host MC, the host protocol interface 160 may perform operations similar to handling the memory write request except that the host protocol interface 160 reads data from the local buffer. More specifically, the host protocol interface 160 may retrieve a read command from the memory read request, retrieve a host physical address (HPA) from the C/A signals of the host protocol interface, and translate the HPA to a local buffer address of the local buffer 180. The host protocol interface 160 may then read the data from the local buffer 180. The host protocol interface 160 may also generate DQ signals according to a given memory protocol, such as the DDR (or other) memory protocol.

In this way, the local buffer 180 serves as a data communication buffer between the host processor 122 and the MCN processor 150, and is exposed to both the host and MCN processors as a part of their respective physical memory spaces, referred to as host physical memory space and MCN physical memory spaces. respectively. Accordingly, the host protocol interface 160 and the local buffer 180 together operate as an MCN interface similar to the conventional NIC 205 as discussed herein.

Figure 3:
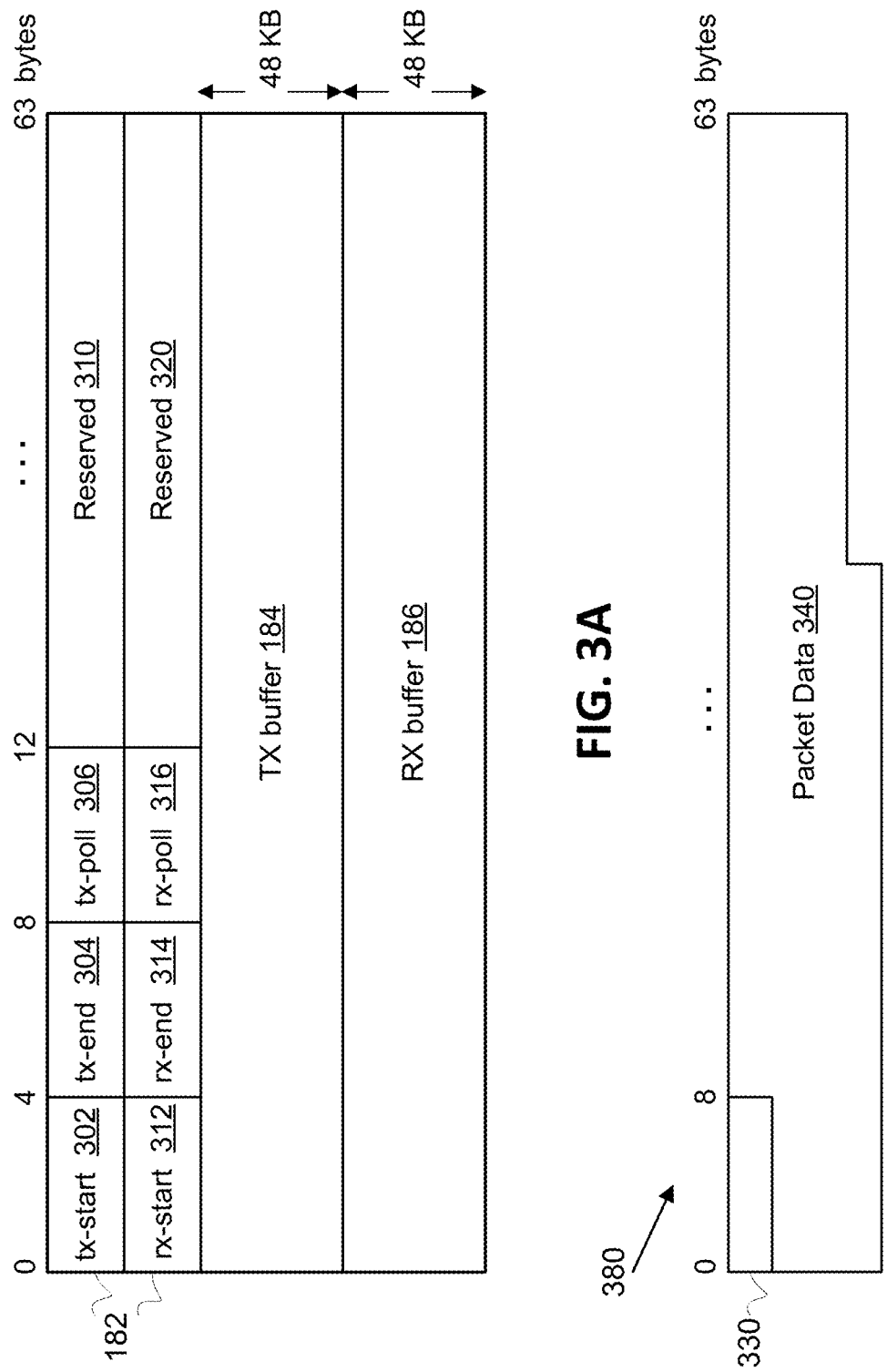
FIG. 3A is a graph diagram illustrative of a local buffer of the MCN processor of FIG. 1C according to an embodiment.
FIG. 3B is a graph diagram illustrative of an MCN message stored in the local buffer according to an embodiment.

FIG. 3A is a graph diagram illustrative of the local buffer 180 of the MCN processor 150 of FIG. 1C according to an embodiment. In various embodiments, the control fields 182 are illustrated by way of example in the first two rows, the first row for transmission (TX) and the second row for receiving (RX). The local buffer 180 may further include the TX buffer 184 and the RX buffer 186, each of which are ring buffers in one embodiment. Other types of buffer configurations are envisioned.

In various embodiments, the control fields 182 provide control metadata values associated with writing to and reading from the TX buffer 184 and the RX buffer 186. For example, the transmission control fields may include a transmit start pointer 302 (e.g., tx start pointer 302), a transmit end pointer 304 (e.g., tx end pointer), a transmit polling field 306 (e.g., tx-poll field 306), and a reserved field 310. The receiving control fields may include a receive start pointer 312 (e.g., rx start pointer 312), a receive end pointer 314 (e.g., rx end pointer 314), a receive polling field 316 (e.g., rx-poll field 316), and a reserved field 320.

The tx-start and tx-end pointers 302, 304 may pointer to the start of the valid data and end of valid data respectively. Based on the area from Multicore Power, Area, and Timing (McPAT) in 22 nm technology, we calculate that the size of this buffer is 0.074 mm2 in 10 nm technology. The McPAT is an integrated power, area, and timing modeling framework for multithreaded, multicore, and many core architectures.

The TX and RX buffers 184, 186 may store MCN messages 380 that are sent to or received from the host processor, respectively. FIG. 3B is a graph diagram illustrative of an MCN message 380 stored in the local buffer 180 according to an embodiment. Each MCN message 380 may include a packet length value 330 and packet data 340. With additional reference to FIG. 3A, the tx-poll and rx-poll fields 306, 316 are used for handshaking between the host processor 122 and the MCN processor 150. The detailed usage of these control bits (or values in these control fields) and the TX and RX buffers will be described in detail later.

In various embodiments, when the OS network layer running on the MCN processor 150 sends a network packet, the MCN driver 157, which is perceived as a regular Ethernet interface, sends the network packet to a range of contiguous MCN physical memory addresses. Cache line entries stored in the local buffer 180 may be mapped similarly as is performed with memory-mapped I/O devices. When the MCN MC 170 receives any memory request directed to the MCN physical memory space (e.g., in the multiple memory components 10A . . . 10D) corresponding to the local buffer 180, the MCN MC 170 re-directs the memory request to the local buffer 180, which is coupled to the MCN MC 170 through an on-chip interconnect, instead of sending the memory request to the DRAM devices on the MCN DIMM 146.

Further, the local buffer 180 may contain logic to implement a hardware interrupt mechanism to notify the MCN processor 150 of any received packet in the RX buffer 186 of the local buffer 180, indicated as IRQ in FIG. 1C. More specifically, the local buffer 180 may send a hardware interrupt signal to one of the cores to notify the core of a received network packet in the receiving (RX) buffer 186 of the local buffer 180 and/or of assertion of the receive polling field 316. In another embodiment, the host protocol interface 160 is to assert the hardware interrupt in response to detection of writing of the received data into the RX buffer 186 and/or assertion of the receive polling field 316.

Upon receiving the hardware interrupt, the core may start a transfer of the network packets from the RX buffer 186 to the kernel memory space of the MCN driver 157 using a memory copy function, e.g., memcpy in Linux, which is used to copy a block of data from a source address to a destination address. The memory copy operation may also be accelerated using a custom DMA engine.

The MCN drivers run on both the host and the MCN DIMMs to create (or emulate) the functionality of an Ethernet interface between the host and MCN processors. An MCN driver exposes itself as a regular Ethernet interface to the upper OS network layers, therefore, MCN does not require changes in the OS network stack, which is an advantage for MCN as there is a resistance towards changes in the TCP/IP architecture.

As illustrated in FIG. 1A, the global memory channel 102A or 102B may be populated with multiple MCN DIMMs (also referred to as MCN nodes). The host driver 125 running on the host processor 122 may create (or emulate) a virtual Ethernet interface with which each MCN node installed on the global memory channels may communicate. That is, a virtual point-to-point connection is provided between the host system 120 and each MCN node in the computing system 100 (to include another distributed computing system as well). A virtual Ethernet interface created on the host system 120 may be referred to herein as a host-side interface. The host OS 127 may then assign a medium access control (MAC) address to the host-side interface. The MAC address may be a unique identifier (usually 48 bits) assigned to a device connected to a network. Further, the MCN processor 150 may execute the MCN driver 157 to also create (or emulate) a virtual Ethernet interface, as each MCN node has one point-to-point connection to the host-side interface. A virtual Ethernet interface created on an MCN node (e.g., the MCN DIMM 146) may be referred to herein as an MCN-side interface.

To create the functionality of the NIC, the host driver 127 may assign an Internet Protocol (IP) address (e.g., IPv4 address) to the host-side interface and the MCN driver 157 may assign another IP address to the MCN-side interface. From the host point of view, all of the MCN nodes are locally connected. Each host-side interface (e.g., for multiple servers) is assigned a unique IP address. The host driver 127 may further set a subnet mask of each host-side interface to 255.255.255.255, e.g., so that the host system 120 forwards a network packet to the host-side interface only when the entire destination IP address of the network packet matches the IP address of the host-side interface.

An MCN node, however, does not have a direct connection to the other MCN nodes and nodes outside of the computing system 100. Therefore, a network packet that is generated by the MCN DIMM 146 (e.g., the MCN node) and is destined to another MCN node (or to a node outside of the computing system 100), has a different destination IP address than the IP address of the host system 120. To support MCN-to-MCN and MCN-to-outside nodes, the MCN driver 157 may set the subnet mask of the MCN-side interface to 0.0.0.0, e.g., so that the outgoing network packets from an MCN node are forwarded to the host system 120 regardless of the IP address of the host system 120. In embodiments, within an MCN node, a network packet with its destination IP address set to localhost2 does not get forwarded to the host system 120 as the kernel first checks if a packet belongs to a loopback network interface. If there is no match, then the MCN-side interface may enumerate other available interfaces. The loopback network interface is a logical, virtual interface in a Cisco® Router. A loopback interface is always up and allows Border Gateway Protocol (BGP) neighborship between two routers to stay up even if one of the outbound physical interface connected between the routers is down.

This setup, with use of the MCN drivers, ensures that the host system 120 arbitrates the traffic to the MCN nodes, including the traffic between the MCN nodes. This network organization also supports the communication between MCN nodes connected to different hosts by having the source host to forward the network packet to the host of the destination MCN node through a conventional NIC.

Figure 4:
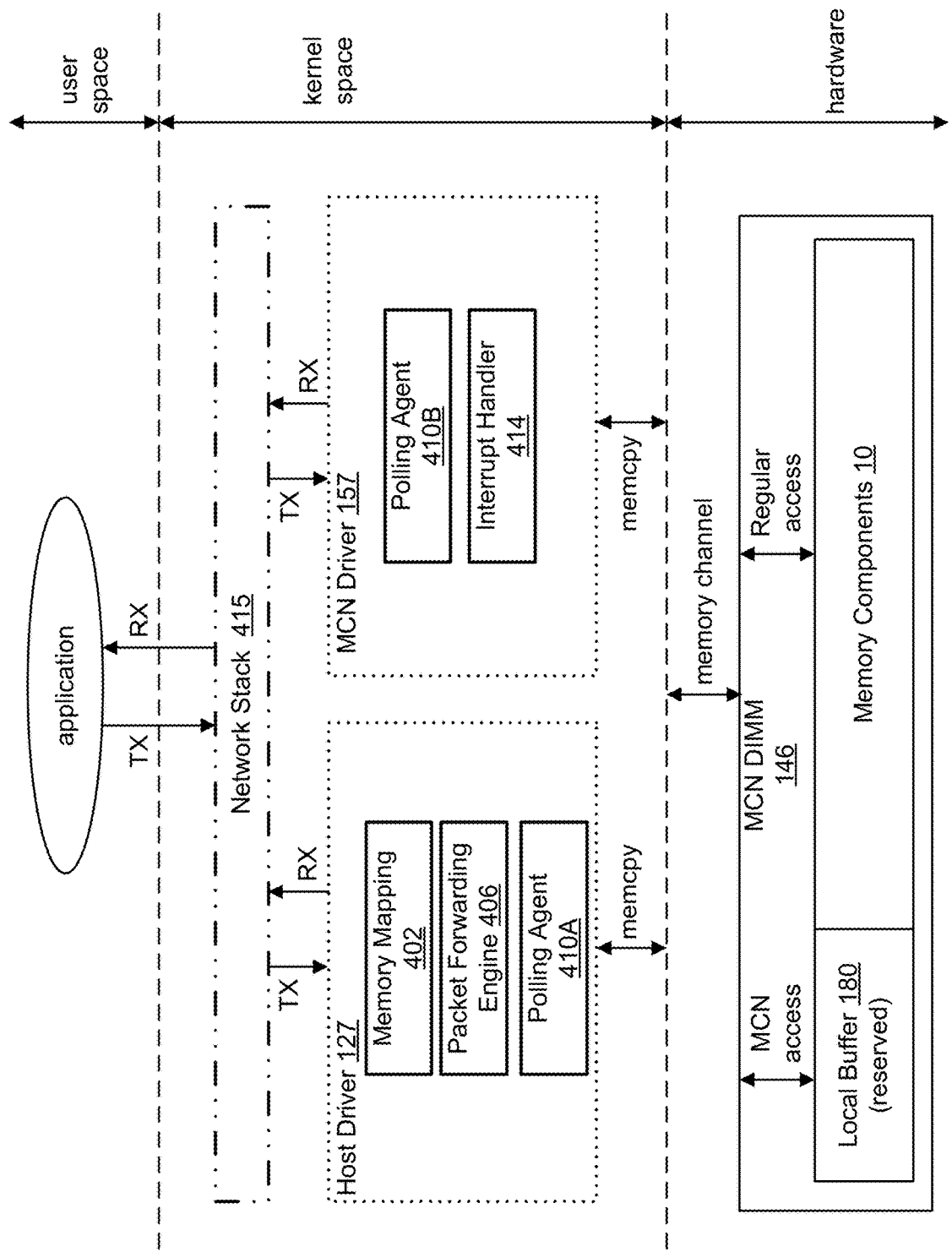
FIG. 4 is a functional flow diagram illustrative of a relationship between the memory channel network hardware, kernel space software, and user space applications according to an embodiment.

FIG. 4 is a functional flow diagram illustrative of a relationship between the memory channel network hardware, kernel space software, and user space applications according to an embodiment. The MCN hardware may include, for example, the MCN DIMM 146, which was discussed with reference to FIGS. 1A-1C. Within the kernel space of the host processor 122, the host driver 127 may include three main components, e.g., a memory mapping unit 402, a packet forwarding engine 406, and a polling agent 410A. The MCN driver 157 may also exist in the kernel space and include a (similar) polling agent 410B as well as an interrupt handler 414. As illustrated, the drivers 127 and 157 may communicate with a network stack 415 (e.g., the Linux network stack in some embodiments), which in turn runs applications within the user space of the computing system 100. Upon initialization of the computing system 100, the host driver 127 or the MCN driver 157 may create a network device object, set up the network object as an Ethernet device, and register the Ethernet device with the kernel of the host OS 125, thereby making a network interface visible to the host OS 125.

In various embodiments, the memory mapping unit 402 of the host driver 127 may account for the memory interleaving across different global memory channels 102A, 102B and ensure that the physical address space of the local buffers (e.g., of multiple MCN nodes) is accessible to the host processor 122 and each MCN processor 150 through virtual memory of the computing system 100.

Further, the polling agent 410A may be responsible for periodically polling the transmit polling field 306 of the local buffers 180 to check for new incoming network packets. If the transmit polling field 306 is asserted (e.g., is non-zero), then the polling agent 410A detects an incoming network packet and alerts the host driver 127 to retrieve the transmission data in the TX buffer 184. Similarly, if the host driver 127 is to transmit a packet to be received by the MCN DIMM 146, then the host MC writes the data into the RX buffer 186 of the local buffer 180, and asserts the receive polling field 316. Upon the receive polling field 316 being asserted, the local buffer 180 may issue the HW interrupt to the core of the MCN processor 150 so that the received data may be written out to the local memory channels 142 or the LLC 104 for processing by the cores 101A-N.

In various embodiments, the polling agent 410B of the MCN driver 157 performs polling on the local buffer 180 to determine whether a new packet is received on the MCN DIMM 146. Additionally, or alternatively, the interrupt handler 414 (e.g., IRQ handler) may be configured to handle hardware interrupts (e.g., IRQs) received from the local buffer 180. This interrupt handler 414 can transfer a network packet from the RX buffer 186 to local memory components 10A . . . 10D through the MCN MC 170. The interrupt handler 414 may also send the network packet from the RX buffer 186 to an upper network layer for processing.

Figure 5:
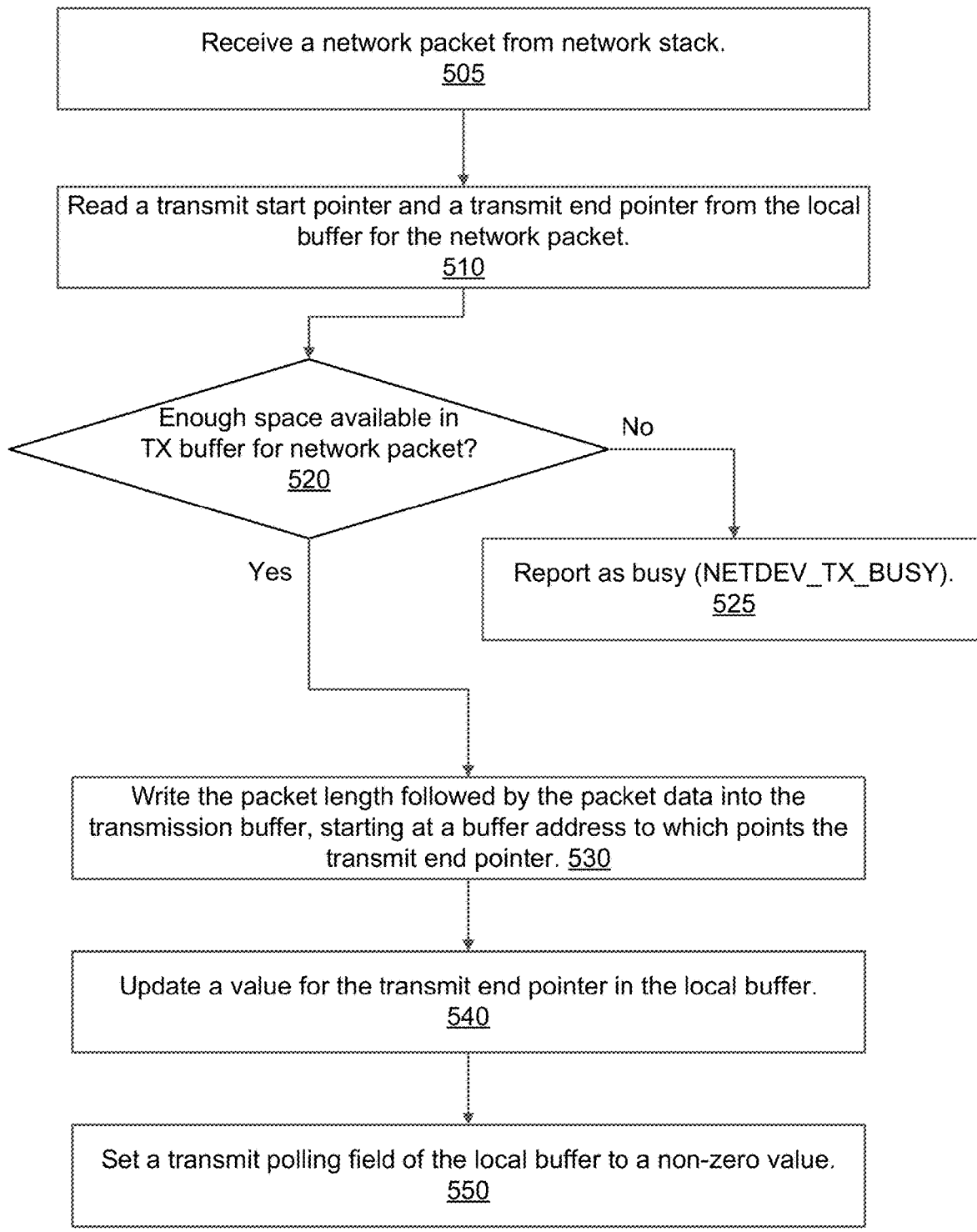
FIG. 5 is a flow chart of a method for handling a network packet received at an MCN-side interface from the network stack according to various embodiments.

FIG. 5 is a flow chart of a method 500 for handling a network packet received at an MCN-side interface from the network stack according to various embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the MCN processor 150 executing the MCN driver 157, as illustrated in FIG. 1B, previously referenced as the MCN-side interface.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 5, at operation 505, the processing logic receives a network packet from the network stack 415. At operation 510, the processing logic reads a transmit start pointer (e.g., tx-start 302) and a transmit end pointer (e.g., tx-end 304) from the local buffer 180 for the network packet.

At operation 520, the processing logic determines whether there is enough space available in the TX buffer 184 (of the local buffer 180) for the network packet. If there is not space, at operation 525, the processing logic reports the local buffer 180 as being busy, e.g., NETDEV_TX_BUSY. If there is sufficient space, at operation 530, the processing logic writes the packet length 330 followed by the packet data 340 (of the network packet) into the TX buffer 184, starting at a buffer address to which points the transmit end pointer (tx-end 304).

With continued reference to FIG. 5, at operation 540, the processing logic updates a value for the transmit end pointer (tx-end 304) in the local buffer. At operation 550, the processing logic sets a transmit polling field (tx-poll 306) of the local buffer 180 to a non-zero value to indicate that a new packet is enqueued in the TX buffer 184. Memory fences may be used to ensure that the packet data has been copied correctly, prior to setting these control bits.

Although FIG. 5 describes the flow of sending a network packet from an MCN node and receiving the network packet at the host processor 122, since the host and MCN nodes run similar drivers (which was discussed with reference to FIG. 4), except for some minor differences, the packet transmission/reception flow is mirrored for the host processor 122 to send a network packet to an MCN node, e.g., the MCN DIMM 146. Some of these minor differences include that the host node will assert the receive polling field 316 to trigger the hardware interrupt (IRQ) to the core of the MCN processor 150, as was discussed, so that the MCN processor 150 knows of the incoming (received) data.

Figure 6:
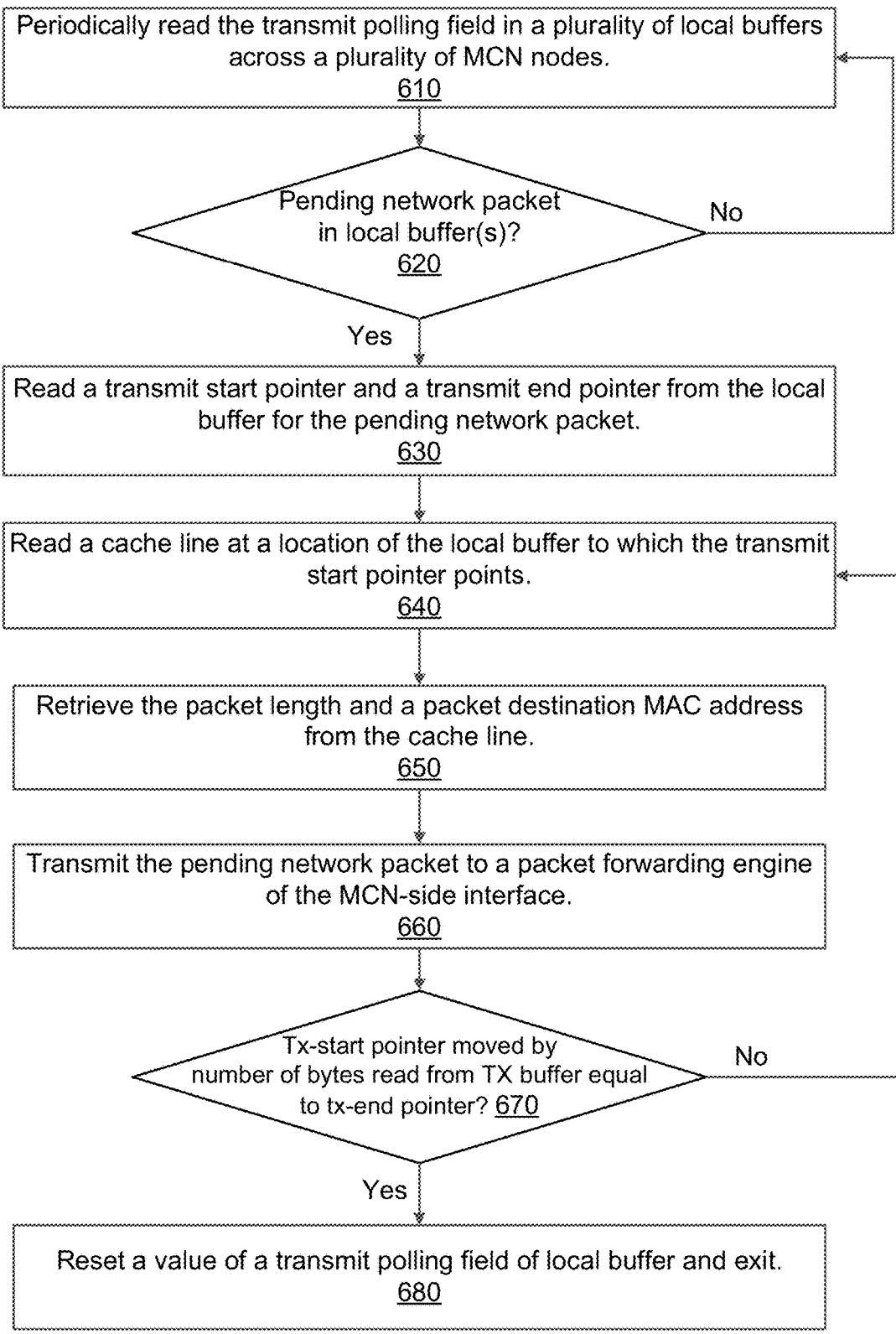
FIG. 6 is a flow chart of a method for a host-side polling agent to determine whether local buffers of MCN processors are attempting to transmit data according to various embodiments.

FIG. 6 is a flow chart of a method 600 for a host-side polling agent to determine whether local buffers of MCN processors are attempting to transmit data according to various embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the host processor 122 executing the host driver 127, as illustrated in FIG. 1A, which may include a host-side polling agent 410A for example.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Because a conventional protocol (e.g., DDR) interface does not provide a signal that can serve as an interrupt or allow a transaction to be initiated by a DIMM, the host-side polling agent may be employed to notify the host processor 122 of incoming packets, which is comparable to functionality of a high-speed NIC. For example, at operation 610, the processing logic periodically reads the transmit polling field (tx-poll 306) in a plurality of local buffers across a plurality of MCN nodes. At operation 620, the processing logic determines whether there is a pending network packet in any of the local buffers. If there is no pending network packet, the method 600, loops back to operation 610 to continue polling the local buffers for a pending network packet.

With continued reference to FIG. 6, at operation 630 and in response to detecting a pending network packet in an local buffer, the processing logic reads a transmit start pointer (tx-start 302) and a transmit end pointer (tx-end 304) from the local buffer 180 for the pending network packet. At operation 640, the processing logic reads a cache line at a location of the local buffer 180 to which the transmit start pointer (tx-start 302) points. At operation 650, the processing logic retrieves the packet length and a packet destination MAC address (e.g., dest-mac) from the cache line. In an Ethernet packet, the first six bytes of the data construct the destination MAC address. At operation 660, the processing logic transmits the pending network packet to the packet forwarding engine 406 of the MCN-side interface.

With continued reference to FIG. 6, at operation 680, the processing logic determines whether the transmit start pointer (tx-start 302) moved by a number of bytes read from the TX buffer 184 of the local buffer 180 is equal to a value of the transmit end pointer. If the number of bytes the transmit start pointer has moved is not equal to the value of the transmit end pointer, at operation 640, the processing logic reads another cache line from the local buffer 180 and continues with operations 650 and 660 for the additional cache line. If the number of bytes the transmit start pointer has moved is equal to the value of the transmit end pointer, at operation 680, reset a value of a transmit polling field of the local buffer and exit.

Figure 7:
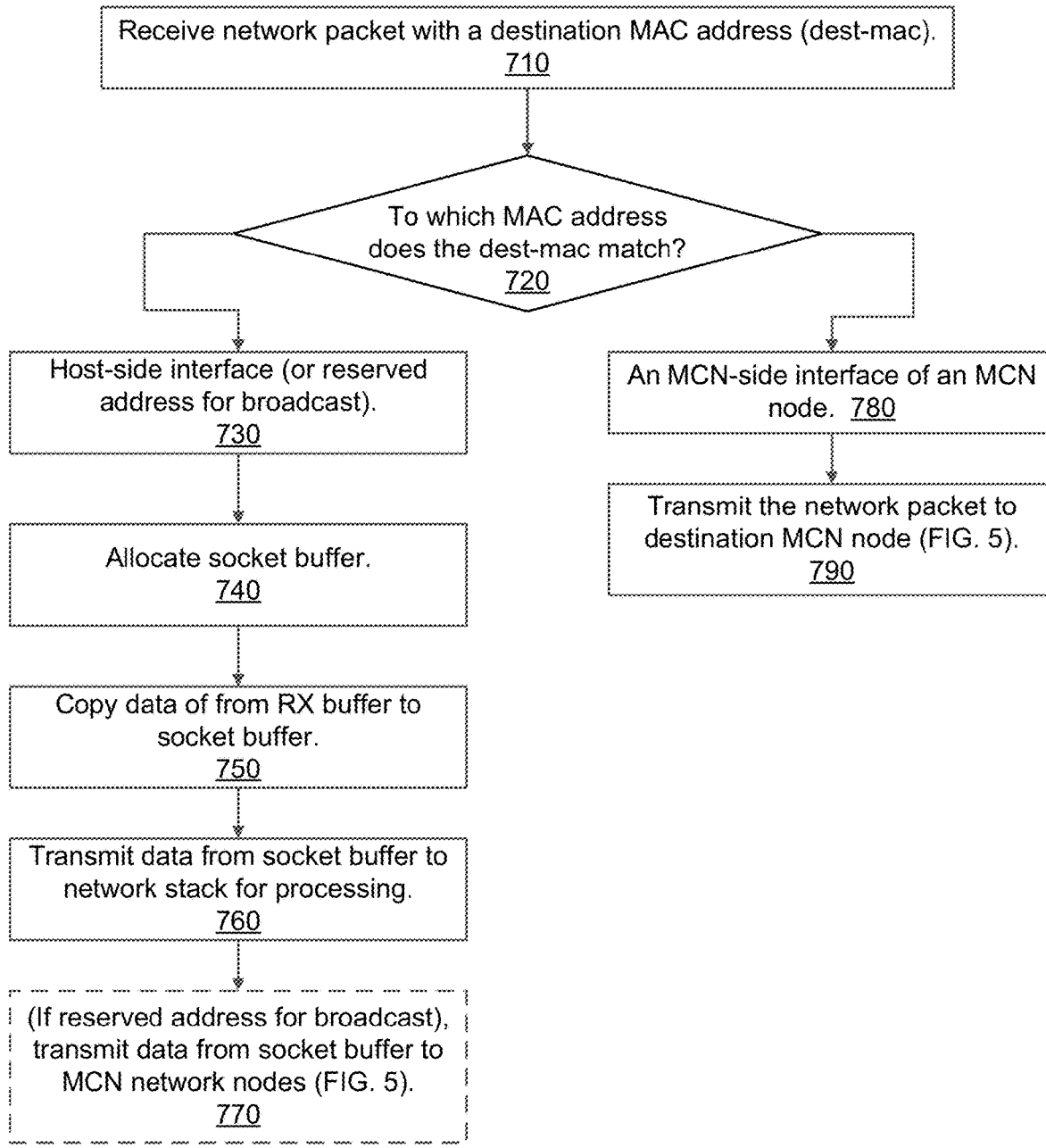
FIG. 7 is a flow chart of a method for the host processor to decide where to route a network packet depending on its medium access control (MAC) address according to various embodiments.

FIG. 7 is a flow chart of a method 700 for the host processor 122 to decide where to route a network packet depending on its medium access control (MAC) address according to various embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the host processor 122 executing the host driver 127 (FIG. 1A). The host processor 122 may utilize the packet forwarding engine 406 of the host driver 127, for example, in execution of the method 700.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 7, at operation 710, the processing logic receives a network packet with a destination MAC address (e.g., dest-mac). At operation 720, the processing logic determines to which MAC address the destination MAC address matches. In one embodiment, at operation 730, the processing logic determines that the dest-mac of the incoming network packet matches the MAC address of the host-side interface. In another embodiment, at operation 730, processing logic determines the dest-mac of the incoming network packet matches a reserved address for broadcast.

In either case, at operation 740, the processing logic allocates a socket buffer. At operation 750, the processing logic copies data of the network packet from the receiving (RX) buffer 186 of the local buffer 180 to the socket buffer. At operation 760, the processing logic transmits the data from the socket buffer to a network stack for processing. In the alternative embodiment, if the dest-mac of the network packet was a reserved address for broadcast, the processing logic may perform operations 740 through 760 and additionally, at operation 770, transmit data from the socket buffer to multiple MCN network nodes (as in broadcasted to available MCN network nodes). This broadcast of the data may be transmitted as described with reference to FIG. 5.

With continued reference to FIG. 7, at operation 780, the dest-mac of the network packet instead matches an MCN-side interface of a reachable MCN node. If so, at operation, 790, the processing logic transmit the network packet to the destination MCN node to which the dest-mac matches, e.g., by using the operations discussed with reference to FIG. 5.

The memory mapping unit 402 of the MCN driver 157 may function as follows. In embodiments of the disclosure, the ioremap( ) function (in Linux) by default creates a page mapping that is tagged as uncacheable in the ARM™ architecture. In embodiments, the ioremap( ) function is used to map the physical address of an I/O device to the kernel virtual address. The kernel creates a page table, e.g., a mapping of virtual address to the physical address that is requested. When the kernel does an iounmap( ) this mapping is destroyed.

Making the page mapping uncacheable enables the physical address space of the MCN processor 150 to be uncacheable, and thus avoid MCN-processed data from being trapped up in cache of the MCN processor 150 when the data should instead be sent on (either to the host processor 122 or stored into local DRAM). Accordingly, making the page mapping uncacheable may prevent unnecessary delay in data processing. While the memory mapping unit 402 making this page mapping (e.g., the page table) as uncacheable prevents coherency issues, the maximum size of a memory access to an uncacheable memory space is double word (e.g., 64 bits).

In various embodiment's, for the bulk memory transfers needed in MCN, the MCN processor 150 may access memory at cache line granularity. Accessing data at cache line granularity may be done using a memory mapping function, e.g., memremap( ) with a MEMREMAP_WC flag, which a similar functionality to ioremap( ). Accessing data at cache line granularity may allow the ability of the MCN MC 170 to perform a write combining, into a group, consecutive write requests (e.g., write commands) at a cache line granularity inside its write queue. On the other hand, read requests (e.g., read commands) to consecutive memory addresses cannot be merged inside a read queue of the MCN MC 170, as doing so violates the memory consistency model. Thus, the host driver 127 may use an uncacheable memory mapping with the write combining support for the TX buffer 184 and a cacheable memory mapping for the RX buffer 186. The host driver 127 may explicitly invalidate the cache lines in the range of RX buffer after receiving a packet.

While accessing the local buffer 180, the MCN-side interface is cognizant of the memory channel interleaving performed by the memory subsystem 110, wherein the successive cache lines in the physical address space are mapped evenly across all the MCs of the host processor 122. This is to maximize the memory channel parallelism when there is spatial locality between the memory accesses. Without accounting for the memory interleaving, a naïve memory copy (e.g., memcpy) would incorrectly spread the packet data across MCN DIMMs in different memory channels, although the host MCs 130A and 130B should send the packet data to a particular MCN DIMM's address space.

In various embodiments, to efficiently resolve this challenge, the host driver 127 may be adapted with a pair of new memory copy functions (e.g., memcpy_to_mcn and memcpy_from_mcn) to map memory operations interleaved across two or more global memory channels 102A and 102B of the host processor 122 to the local buffer of multiple memory modules (e.g., MCN DIMMs of FIG. 1A). The local buffers may be isolated from the two or more global memory channels. These new memory copy functions may perform memory copying such that the 64-byte blocks within the address space of the MCN DIMMs are interleaved in a manner that reflects the memory interleaving of the host processor 122. This allows the MCN driver 157 to send a network packet to an appropriate memory channel and thus an appropriate MCN DIMM.

Figure 8:
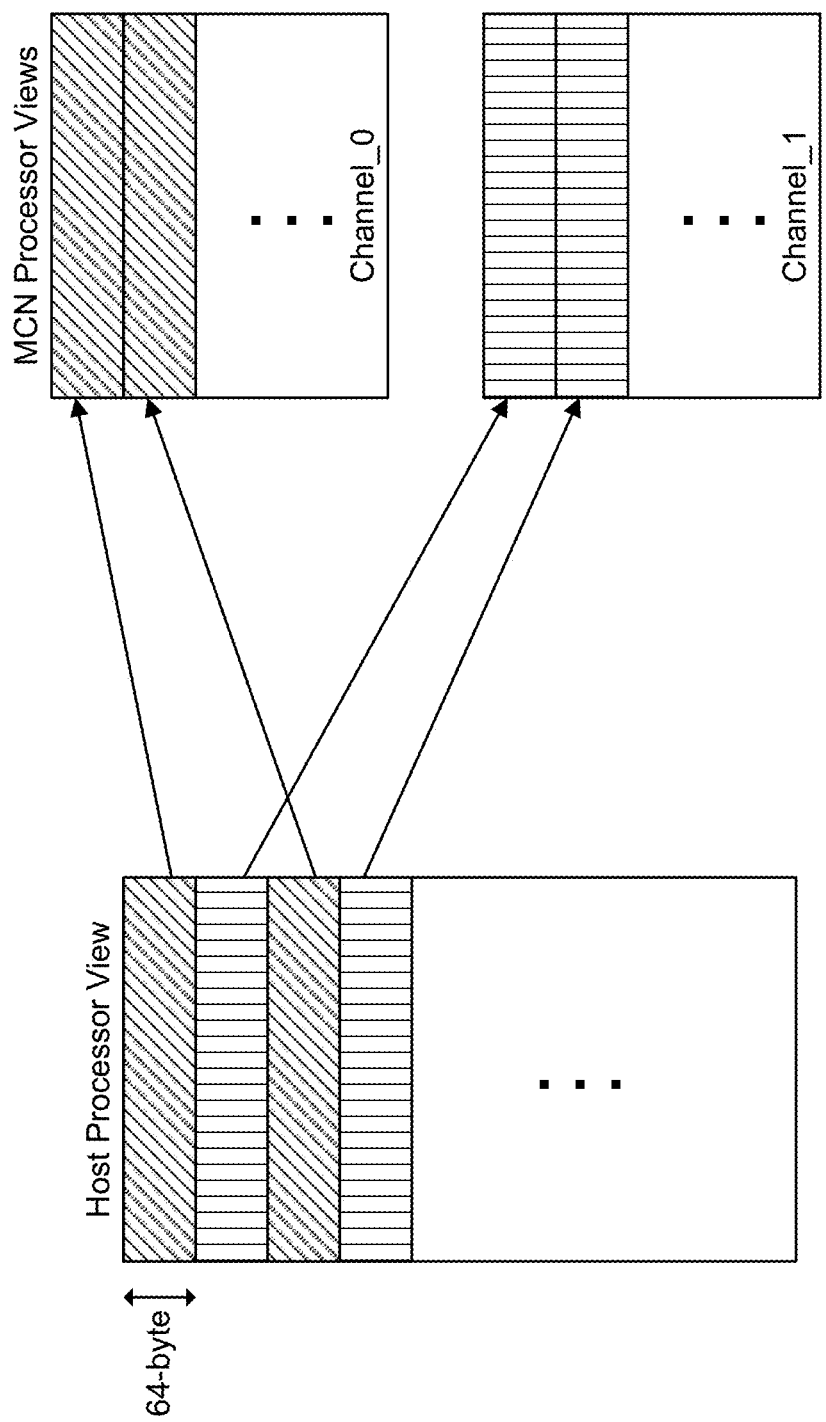
FIG. 8 is a set of graphs illustrative of host processor view of interleaved arrangement of physical address space versus MCN processor views of that physical address space according to an embodiment.

FIG. 8 is a set of graphs illustrative of host processor view of interleaved arrangement of physical address space versus MCN processor views of that physical address space according to an embodiment. The host processor 122 may view a single physical address space in which data from memory operations (or requests) are interleaved with regard to one of the global memory channels 102A or 102B, e.g., a single memory channel. Accordingly, although consecutive memory operations may be accessing consecutive addresses with MCN physical address space, the host processor 122 may still interleave the memory accesses across the global memory channels, as illustrated on left in FIG. 8, which may be understood to show one of the global memory channels.

In contrast, the MCN processor 150 views multiple memory channels depending on a number of the local memory channels 142 existing within the MCN processor 150. Because consecutive memory accesses to consecutive physical addresses within the MCN physical address space should occur at the same global memory channel 102A or 102B, the host driver 127 may be adapted to perform a pair of memory copy functions to map memory operations interleaved across two or more global memory channels of the host processor to a single global memory channel on which the destination MCN DIMM 146 is installed. In other words, the host driver 127 may perform the memory copy functions to map memory operations, which are directed at consecutive addresses of physical memory space of the plurality of memory modules, to a single global memory channel to which is coupled an identified memory module associated with the consecutive addresses. The host MC 130A or 130B may then direct the mapped memory operations to the single global memory channel. The host driver 127 operation may further enable the host processor 122 to broadcast network packets to multiple memory modules (e.g., MCN DIMMs) over a single global memory channel.

More specifically, the above-mentioned pair of memory copy functions may include a copy-to-MCN function (e.g., memcpy_to_mcn(mcn_dest, host_src)) and a copy-from-MCN function (e.g., memcpy_from_mcn(host_dest, mcn_src)) in order to appropriately write to and read from consecutive physical memory addresses with respect to the MCN processor view of the address space (on the right in FIG. 8). For example, the copy-to-MCN function may cause host_src (or transmission) data (which may be allocated on CONV DIMMs 112AB or 114AB and is interleaved between global memory channels 102A and 102B) to be copied to an identified MCN memory module over a single global memory channel 102A or 102B (FIG. 1A). In various embodiments, the identified memory module is a destination MCN DIMM 116A or 116B (over global memory channel 102A) or 118A or 118B (over global memory channel 102B). The copy-to MCN function performs as a write to the MCN DIMM, and is thus directed at physical address space of the local buffer 180. Further, in executing the copy-to-MCN function, the host driver 127 may split data packets into chunks, appropriately address these chunks according to the global channel interleaving, and forward the newly addressed data chucks to the host MC 130A or 130B.

In various embodiments, the copy-from-MCN function may perform the opposite operation, e.g., is to read mcn_src (or receive) data from the single global memory channel (e.g., from the local buffer 180 of the identified memory module) and write the mcn_src data to a host destination (host_dest) buffer. As before, the host_dest buffer may be allocated on CONV DIMMs and be interleaved between the global memory channels 102A and 102B.

In various embodiments, these new memory functions may, in this way, map a host processor view of the physical address space to an MCN processor view of the physical address space that involves two memory channels. As there is an MCN driver 157 assigned to each local memory channel 142 and a typical distributed application sends packets to multiple MCN nodes, the memory requests from these MCN drivers may still concurrently utilize the global and local memory channels.

There has been identified two bottlenecks towards utilizing MCN architecture to its full capabilities. First, the TCP congestion control is implemented for slow, long latency network connections and sometimes takes several seconds to reach to the full bandwidth utilization. Also, TCP frequently sends ACK messages to the sender. Sending and receiving ACK messages consumes both CPU cycles and network bandwidth. Based on evaluation results, sending and receiving ACK messages incurs up to approximately 25% overhead in a TCP connection, which is aligned with previous studies.

Second, an MCN DIMM can only use a single channel bandwidth and cannot interleave the memory accesses across multiple memory channels. That being said, the maximum theoretical MCN bandwidth is 12.8 GB/s, which is the maximum bandwidth of a single memory channel. Although the bandwidth of each MCN node is limited to the bandwidth of a single memory channel, this bandwidth is far from being a bottleneck as the bandwidth of a single memory channel alone is more than 100 Gbps. Nonetheless, each MCN DIMM can communicate with the host or each other independently, providing aggregate bandwidth proportional to the total number of memory channels in the system.

The MCN architecture may deploy use of a specialized TCP/IP stack for the MCN processor 150 that resembles a user space TCP stack such as mTCP. When communicating between MCN DIMMs, the MCN network stack 415 may not rely on the conventional TCP/IP stack, and instead may resemble a shared memory communication channel between host and MCN nodes.

The present disclosure enables the MCN architecture without changes in the software stack and the host processor architecture. In the following paragraphs, we identify some inefficiencies in the naïve MCN implementation and exploit some unique properties of a memory channel to further increase the bandwidth and decrease the latency of MCN. Specifically, we first look to optimize the software stack which does not demand any hardware change. Second, we propose to optimize the memory subsystem architecture if permitted to slightly change the host processor architecture as well.

In some embodiments, the MCN architecture may first exploit the features in the OS and conventional processors, and use an efficient polling mechanism to reduce the communication latency between the host processor 122 and the MCN processors 150. Second, the MCN architecture may exploit the fact that the Bit Error Rate (BER) of a memory channel is orders of magnitude lower than that of a network link and thus may bypass the checksum calculation to detect any error in a received packet and adopt a larger frame size for the packets.

A core (on the host processor 122) running a polling function (such as a tasklet or thread) to determine whether network packets (e.g., MCN messages) are available for transmission in the local buffer 180 can neither sleep nor accept a timer to reschedule. Consequently, the polling function can overwhelm the core by continually rescheduling itself. To more efficiently support a polling mechanism, the host processor 122 can employ a high-resolution (HR) timer that reschedules a polling function call at a specific time with a nanosecond resolution. Specifically, whenever the HR-timer routine is invoked, the HR timer schedules a tasklet for running the polling function and then exits. The host processor 122 may be programmed to schedule a tasklet because the interrupts in the HR timer service routine are disabled and directly calling the polling function can result in missing the interrupts from other devices while doing the polling. Hence, any function called inside an HR timer should be very short (e.g., scheduling a tasklet). Note that a tasklet is interruptible and does not negatively impact a high priority process.

In various embodiments, the network stack 415 inspects a Cyclic Redundancy Check (CRC) value or checksum of a network packet to detect any error before it delivers the network packet to the next network layer. Since the checksum calculation for each packet consumes host and MCN processors cycles, the checksum calculation may limit the maximum bandwidth and the minimum latency. To reduce such an overhead, the network stack 415 may support an interface to offload the checksum calculations to hardware in the NIC. We propose a much simpler mechanism to efficiently handle checksum calculations. Since a memory channel is protected by ECC-based error detection and correction (and CRC in DDR4), the network stack 415 need not redundantly generate a checksum value for an MCN message. Therefore, the header checksum checking in the TCP/IP network stack 415 may be disabled without affecting the reliability of TCP.

The standard MTU of an Ethernet frame is 1.5 KB, as discussed above. A larger MTU can better amortize the protocol processing software overhead and improve the network performance. Although the network stack 415 can support a larger MTU, if the network stack 415 uses the default size as a larger packet going through the conventional Ethernet links, the larger packet is more likely to be corrupted and incur a higher cost for a re-transmission. However, the MCN architecture can efficiently deploy a larger frame size as the BER of a memory channel is typically multiple orders of magnitude lower than that of an Ethernet link. Exploiting such an advantage, the size of the MTU employed within the MCN architecture may be increased, e.g., up to at least 9 KB. This can be done by configuring the interface via the Linux ifconfig utility. The unique MCN message format described with reference to FIG. 3B may seamlessly support any MTU size.

Even with a large MTU size, the network stack 415 may still need to divide a bulk user data chunk into multiple MTU-sized packets. Each of these packets undergoes TCP/IP processing and pays the overhead of segmentation. To optimize bulk data transfer, modern NICs support TCP segmentation offload (TSO), which offloads the segmentation to the NIC hardware. The driver of a TSO-enabled NIC provides a TCP/IP header along with a large data chunk to the NIC. The TSO-enabled NIC may perform the following actions to send the data chunk. First, the TSO-enabled NIC may divide the data chunk into several MTU sized segments. Next, the TSO-enabled NIC may copy the TCP/IP header at the beginning of each data segment. Next, the TSO-enabled NIC may calculate and set the Total Length, Header Checksum, and Sequence Number fields of each TCP/IP header. Next, the TSO-enabled NIC may send out each MTU sized packet. The MCN drivers may support TSO by ensuring that there is sufficient space in the TX and RX buffers 184, 186 for the largest possible user data chunk allowed by the network stack. Since the network stack 415 can also bypass the performing the checksum, the network stack 415 may also be updated to set the Total Length field of the TCP/IP header to the user data chunk size and then transmit the unsegmented packet to the destination MCN node.

There are two bottlenecks to being able to accomplish a higher bandwidth and lower latency in the MCN architecture, including the lack of an interrupt mechanism to notify the host processor of the received packets from MCN DIMMs and a memory-to-memory copy accelerator to efficiently transfer the packet data from (to) the host processor 122 to (from) an local buffer 180 in an MCN node. To resolve these limitations, we propose to slightly change the memory subsystem 110 of the host processor as a set of optional optimizations as will be discussed.

In some embodiments, a high-resolution (HR) timer may be implemented within the polling agent 410A to more efficiently implement the polling agent 410A. However, whenever the HR-timer is called, an interrupt is asserted, which incurs a performance overhead if the polling fails and no packet is received. If the timer interval is increased to minimize the overhead, then the average packet transmission latency increases as well. Additionally, upon receiving an HR-timer interrupt, the driver scans across the MCN DIMMs on all channels, which further increases the overhead of the polling.

To further reduce the host-side polling overhead, the MCN-DIMMs may leverage an existing hardware interrupt-like signal (e.g., ALERT_N in the DDR4 standard, or other similar signal that can be repurposed) that may be sent to the host MC 130A or 130B. More specifically, the host protocol interface 160 may transmit the hardware interrupt-like signal as a hardware interrupt to the host MC 130A or 130B, to notify the MC 130A or 130B of data available in the local buffer 180. The host MC receiving the hardware interrupt (e.g., the ALERT_N signal) from a memory channel may then identify (e.g., via polling the local buffers 180) which DIMM on the channel has asserted the hardware interrupt. The MC 130A or 130B may then relay the signal to a core of the host processor 122 as an interrupt, e.g., as an alert that data is stored in an identified local buffer 180 for transmission to the host MC. This mechanism not only eliminates the need for periodic polling, but also allows the MCN driver(s) to immediately know which local memory channel should be checked.

The host processor 122 and MCN processor 150 may each be responsible for copying packets between local buffers and the MCN physical memory space with the memcpy function. Consequently, the host and MCN processors issuing many memory requests can become a bottleneck, especially when they exchange many packets. The host processor 122 may also be responsible for routing packets between MCN nodes, potentially creating another bottleneck when there is a spike in the traffic between MCN nodes. These bottlenecks can be resolved by implementing MCN DMA engines (MCN-DMA) in the memory controller (MC) of both the host and MCN processors to which to offload memory requests. The MCN-DMA performs the memory copy operations on behalf of the host and MCN processors, and frees up processor cycles for other tasks. Except the fact that an MCN-DMA is to be cognizant of the memory channel interleaving, the MCN-DMA operates similar to a conventional DMA engines in an I/O device.

As a proof of concept, we developed a prototype MCN system using an experimental buffered DIMM and an IBM POWER8 S824L system shown in FIG. 9A and FIG. 9B, respectively. The prototype MCN DIMM couples two 32 GB DDR3-1066 DIMMs with an Intel (Altera) Stratix V FPGA that interfaces directly with the host memory channel, the IBM Differential Memory Interface (DMI). We implemented an MCN DIMM architecture based on a soft IP core, NIOS II embedded processor acting as an MCN processor in the FPGA. We also implemented the MCN local buffer with BRAM blocks, custom glue logic to connect the buffer with DMI/Avalon interface, and used Intel's Avalon as the internal bus in the FPGA. Finally, we developed the drivers for the IBM host processor and the NIOS II processor based on the previously provided descriptions. FIG. 9C depicts the prototype system architecture.

Figure 10:
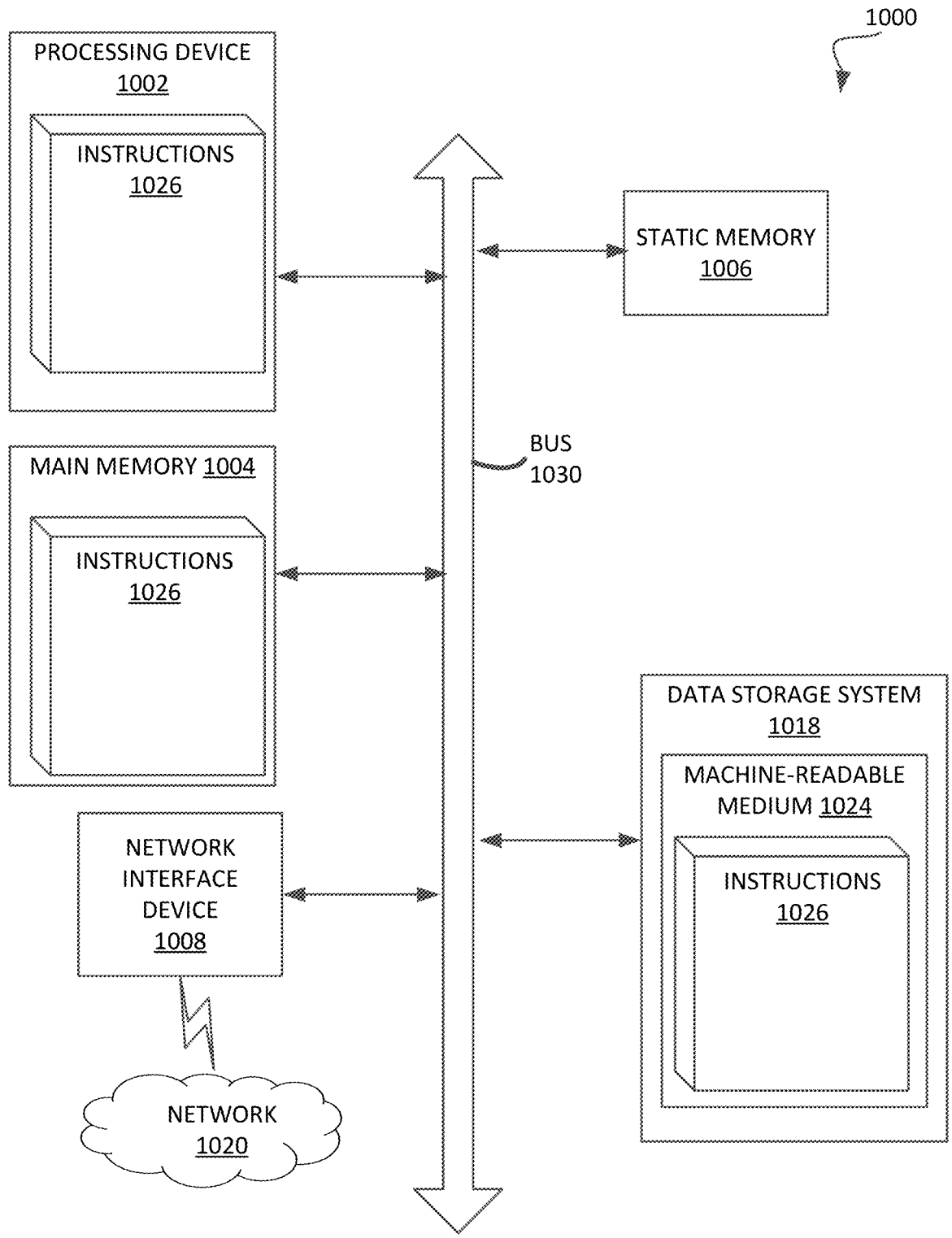
FIG. 10 is a block diagram of an example computer system in which embodiments of the present disclosure can operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1A) or can be used to perform the operations of a host MC 130A or 130B, the host OS 125, or the host driver 127. In other embodiments, the computer system 1000 can correspond to an MCN module (e.g., DIMM) of FIG. 1B that includes or is coupled to the MCN MC 170 (FIG. 1C), the MCN OS 155, or the MCN driver 157. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1A or the MCN processor 150 of FIG. 1C.

In one embodiment, the instructions 1026 include instructions to implement functionality corresponding to any OS, driver, software, or network stacked described herein. While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computing device comprising:
    a host processor to:
        execute a host driver to create a host-side interface, the host-side interface emulating a first virtual Ethernet interface; and
        assign the host-side interface a first medium access control (MAC) address and a first Internet Protocol (IP) address;
    a substrate on which is disposed memory components; and
    a memory channel network (MCN) processor disposed on the substrate and coupled between the memory components and the host processor, the MCN processor to:
        execute an MCN driver to create an MCN-side interface, the MCN-side interface emulating a second virtual Ethernet interface; and
        assign the MCN-side interface a second MAC address and a second IP address, which identify the MCN processor as an MCN network node to the host processor; and
    wherein the MCN driver, when executed by the MCN processor, is to:
        create a network device object;
        set up the network device object as an Ethernet device; and
        register the Ethernet device with a kernel of the host processor, to make the MCN-side interface visible to a host operating system executing on the host processor.

2. The computing device of claim 1, wherein, upon receipt of a network packet having a third IP address directed to a second MCN-side interface, the host-side interface is to forward the network packet to the second MCN-side interface comprising a second MCN network node.

3. The computing device of claim 1, wherein the MCN processor is further to configure the MCN-side interface so that outgoing network packets from the MCN network node are forwarded to the host-side interface for routing.

4. The computing device of claim 1, wherein the MCN processor comprises:
    a core to execute the MCN driver; and
    a local buffer coupled to the core, the local buffer to store MCN messages that are sent to and received from the host-side interface, each MCN message comprising a packet length and packet data.

5. The computing device of claim 4, wherein, in response to a network packet received at the MCN-side interface from a network stack, the MCN-side interface is to:
    read a transmit start pointer and a transmit end pointer from the local buffer for the network packet;
    in response to sufficient space being available in a transmission buffer of the local buffer, write the packet length followed by the packet data into the transmission buffer, starting at a buffer address to which points the transmit end pointer;

update a value for the transmit end pointer in the local buffer; and
set a transmit polling field of the local buffer to a non-zero value to indicate that a new packet is enqueued in the transmission buffer.

6. The computing device of claim 4, wherein the local buffer comprises a transmit polling field, and the host-side interface comprises a polling agent to:
periodically read the transmit polling field in a plurality of local buffers across a plurality of MCN nodes, to determine whether there is a pending network packet; and
upon detection of a pending network packet in one of the plurality of local buffers:
read a transmit start pointer and a transmit end pointer from the local buffer for the pending network packet;
read a cache line at a location of the local buffer to which points the transmit start pointer;
retrieve the packet length and a packet destination MAC address from the cache line; and
transmit the pending network packet to a packet forwarding engine of the host-side interface.

7. The computing device of claim 6, wherein the host-side interface is further to:
if the transmit start pointer moved by a number of bytes read from a transmission buffer of the local buffer is not equal to a value of the transmit end pointer, read an additional at least one more cache line from the plurality of local buffers; and
if the transmit start pointer moved by a number of bytes read from the transmission buffer of the plurality of local buffers is equal to a value of the transmit end pointer, reset a value of a transmit polling field of the local buffer and exit.

8. The computing device of claim 4, wherein the host-side interface comprises a packet forwarding engine to, in response to receipt of a network packet:
determine that a destination MAC address of the network packet matches the first MAC address;
allocate a socket buffer;
copy data of the network packet from a receiving buffer of the local buffer to the socket buffer; and
transmit the data from the socket buffer to a network stack for processing.

9. The computing device of claim 4, wherein the host-side interface comprises a packet forwarding engine to, in response to receipt of a network packet:
determine that a destination MAC address of the network packet matches a reserved address for broadcast;
allocate a socket buffer;
copy data of the network packet from a receiving buffer of the local buffer to the socket buffer;
transmit the data from the socket buffer to a network stack for processing; and
transmit the data from the socket buffer to a plurality of MCN network nodes.

10. The computing device of claim 4, wherein the host-side interface comprises a packet forwarding engine to, in response to receipt of a network packet:
determine that a destination MAC address of the network packet matches a second address of a destination MCN node of a plurality of MCN network nodes; and
transmit the network packet to the destination MCN node.

11. The computing device of claim 1, wherein the substrate is an MCN dual in-line memory module (DIMM).

12. The computing device of claim 1, wherein the MCN processor is further to operate according to a memory-based physical layer (PHY) protocol.

13. A method comprising:
executing, by a host processor, a host driver to create a host-side interface, the host-side interface emulating a first virtual Ethernet interface; and
assigning, by the host processor, the host-side interface a first medium access control (MAC) address and a first Internet Protocol (IP) address;
executing, by an MCN processor co-located on a substrate with memory components, an MCN driver to create an MCN-side interface, the MCN-side interface emulating a second virtual Ethernet interface, wherein the MCN processor is coupled between the memory components and the host processor, wherein executing the MCN driver further comprises:
creating a network device object;
setting up the network device object as an Ethernet device; and
registering the Ethernet device with a kernel of the host processor, to make the MCN-side interface visible to a host operating system executing on the host processor; and
assigning, by the MCN processor, the MCN-side interface a second MAC address and a second IP address, which identify the MCN processor as an MCN network node to the host processor.

14. The method of claim 13, wherein, in response to receiving a network packet having a third IP address directed to a second MCN-side interface, the method further comprises forwarding, by the host-side interface, the network packet to the second MCN-side interface, wherein the second MCN-side interface comprises a second MCN network node.

15. The method of claim 13, further comprising configuring, by the MCN processor, the MCN-side interface so that outgoing network packets from the MCN network node are forwarded to the host-side interface for routing.

16. The method of claim 13, further comprising storing, by the MCN processor, at a local buffer, MCN messages that are sent to and received from the host-side interface, each MCN message comprising a packet length and packet data.

17. The method of claim 16, wherein, in response to receiving a network packet at the MCN-side interface from a network stack, the method further comprises:
reading, by the MCN-side interface, a transmit start pointer and a transmit end pointer from the local buffer for the network packet;
wherein, in response to sufficient space being available in a transmission buffer of the local buffer, the method further comprises writing the packet length followed by the packet data into the transmission buffer, starting at a buffer address to which points the transmit end pointer;
updating a value for the transmit end pointer in the local buffer; and
setting a transmit polling field of the local buffer to a non-zero value to indicate that a new packet is enqueued in the transmission buffer.

18. The method of claim 13, wherein the method further comprises operating the MCN processor according to a memory-based physical layer (PHY) protocol.

* * * * *